United States Patent
Guan et al.

(10) Patent No.: US 12,518,130 B2
(45) Date of Patent: Jan. 6, 2026

(54) SMART MEMORY EXTENSION TO PROCESSORS

(71) Applicant: Alibaba (China) Co., Ltd., Hangzhou (CN)

(72) Inventors: Yijin Guan, Beijing (CN); Dimin Niu, Sunnyvale, CA (US); Shengcheng Wang, Shanghai (CN); Shuangchen Li, Sunnyvale, CA (US); Hongzhong Zheng, Los Gatos, CA (US)

(73) Assignee: Alibaba (China) Co., Ltd., Hangzhou (CN)

( * ) Notice: Subject to any disclaimer, the term of this patent is extended or adjusted under 35 U.S.C. 154(b) by 636 days.

(21) Appl. No.: 18/070,418

(22) Filed: Nov. 28, 2022

(65) Prior Publication Data
US 2024/0005127 A1 Jan. 4, 2024

(30) Foreign Application Priority Data
Jul. 1, 2022 (CN) .......................... 202210773546.5

(51) Int. Cl.
G06N 3/04 (2023.01)
G06F 1/16 (2006.01)

(52) U.S. Cl.
CPC ............. *G06N 3/04* (2013.01); *G06F 1/1632* (2013.01)

(58) Field of Classification Search
None
See application file for complete search history.

(56) References Cited

U.S. PATENT DOCUMENTS

| | | |
|---|---|---|
| 8,489,898 B2 | 7/2013 | Wong |
| 9,170,940 B2 | 10/2015 | Van De |
| 9,268,378 B2 | 2/2016 | Rotem et al. |
| 9,647,684 B2 | 5/2017 | Lak et al. |
| 9,891,681 B2 | 2/2018 | Jeganathan et al. |
| 9,955,110 B2 | 4/2018 | Chew et al. |
| 10,102,260 B2 | 10/2018 | Lancaster et al. |
| 10,146,845 B2 | 12/2018 | Henrichs et al. |
| 10,199,014 B2 | 2/2019 | Kwa et al. |
| 10,503,524 B2 | 12/2019 | Nicholson et al. |
| 10,902,013 B2 | 1/2021 | Lancaster et al. |
| 11,263,143 B2 | 3/2022 | Gupta et al. |
| 2016/0292813 A1 | 10/2016 | Bittner et al. |
| 2017/0102950 A1 | 4/2017 | Chamberlain et al. |
| 2017/0195173 A1 | 7/2017 | Zenberg et al. |
| 2019/0065954 A1 | 2/2019 | Bittner, Jr. et al. |

(Continued)

*Primary Examiner* — Baboucarr Faal
(74) *Attorney, Agent, or Firm* — Sheppard Mullin Richter & Hampton LLP

(57) ABSTRACT

This application describes systems and methods for facilitating memory access for graph neural network (GNN) processing. An example system includes a plurality of processing units, each configured to perform graph neural network (GNN) processing; and a plurality of memory extension cards, each configured to store graph data for the GNN processing, wherein: each of the plurality of processing units is communicatively coupled with three other processing units via one or more interconnects respectively; the plurality of processing units are communicatively coupled with the plurality of memory extension cards respectively; and each of the plurality of memory extension cards includes a graphic access engine circuitry configured to acceleratre GNN memory access.

19 Claims, 24 Drawing Sheets

(56) References Cited

U.S. PATENT DOCUMENTS

| | | |
|---|---|---|
| 2019/0114194 A1 | 4/2019 | Jani et al. |
| 2020/0202246 A1 | 6/2020 | Lin et al. |
| 2020/0226473 A1 | 7/2020 | Sharma et al. |
| 2020/0242126 A1 | 7/2020 | Henrichs et al. |
| 2023/0064080 A1* | 3/2023 | Guan .................... G06F 12/128 |
| 2023/0153568 A1* | 5/2023 | Guan ....................... G06N 3/04 |
| | | 706/25 |
| 2024/0289603 A1* | 8/2024 | Shiu ....................... G06N 3/006 |
| 2024/0338551 A1* | 10/2024 | Sheikh ................... G06N 3/045 |

* cited by examiner

1600

```
1610: fetching, by a memory extension card, a portion of structure data of a graph
from one or more memories in the memory extension card
```

```
1620: performing node sampling using the fetched portion of the structure
data of the graph to select one or more sampled nodes
```

```
1630: fetching a portion of attribute data of the graph from the one or more
memories according to the selected one or more sampled nodes
```

```
1640: sending the fetched portion of the attribute data of the graph to a processing
unit through the interconnect of the first type
```

```
1650: performing GNN processing for the graph using the fetched portion of
the attribute data
```

FIG. 16

SMART MEMORY EXTENSION TO PROCESSORS

CROSS-REFERENCE TO RELATED APPLICATION

This application claims priority to and benefits of Chinese patent Application No. 202210773546.5, filed with the China National Intellectual Property Administration (CNIPA) on Jul. 1, 2022. The entire contents of the above-identified application are incorporated herein by reference.

TECHNICAL FIELD

The disclosure relates generally to customized boards for memory accessing.

BACKGROUND

While traditional deep learning models are good at pattern recognition and data mining by capturing hidden patterns of Euclidean data (e.g., images, text, videos), graph neural networks (GNNs) have shown to extend the power of machine learning to non-Euclidean domains represented as graphs with complex relationships and interdependencies between objects. Research has shown that GNNs can exceed state-of-the-art performance on applications ranging from molecular inference to community detection.

GNNs can be a very effective model for unstructured data modeling and processing. Recently, GNNs are becoming more and more utilized in applications such as recommendation systems, risk control systems, etc. Graph data may be unstructured. As a result, accessing graph data may result in random memory accesses.

SUMMARY

Various embodiments of the present specification may include hardware circuits, systems, methods for efficient memory allocation for sparse matrix multiplications.

According to one aspect, a system comprises a first processing unit, a second processing unit, a third processing unit, and a fourth processing unit, each configured to perform graph neural network (GNN) processing; and a first memory extension card, a second memory extension card, a third memory extension card, and a fourth memory extension card, each configured to store graph data for the GNN processing, wherein: each of the first processing unit, the second processing unit, the third processing unit, and the fourth processing unit are communicatively coupled with each of the first memory extension card, the second memory extension card, the third memory extension card, and the fourth memory extension card respectively via an interconnect of a first type; the first processing unit is communicatively coupled with each of the third processing unit and the fourth processing unit via an interconnect of the first type; the second processing unit is communicatively coupled with each of the third processing unit and the fourth processing unit via an interconnect of the first type; the first processing unit is communicatively coupled with the second processing unit via two interconnects of a second type; the third processing unit is communicatively coupled with the fourth processing unit via two interconnects of the second type; the first memory extension card is communicatively coupled with each of the second memory extension card and the third memory extension card via an interconnect of a third type; the fourth memory extension card is communicatively coupled with each of the second memory extension card and the third memory extension card via an interconnect of the third type; and each of the first, second, third, and fourth memory extension cards includes a graphic access engine circuitry configured to accelerate GNN memory access.

In some embodiments, a bandwidth of each of the interconnects of the second type is half of a bandwidth of each of the interconnects of the first type.

In some embodiments, a form factor for each of the interconnects of the first type is two QSFP-DD ports, the two QSFP-DD ports having a bandwidth equal to or larger than 100 GB/s.

In some embodiments, a form factor for each of the interconnects of the second type is four Mini-SAS ports, the four Mini-SAS ports having a bandwidth equal to or larger than 50 GB/s; the first processing unit is communicatively coupled with the second processing unit via two parallel interconnects of the second type; and the third processing unit is communicatively coupled with the fourth processing unit via two parallel interconnects of the second type.

In some embodiments, a form factor for each of the interconnects of the third type is one QSFP-DD port, the one QSFP-DD port having a bandwidth equal to or larger than 50 GB/s.

In some embodiments, each of the memory extension cards is further configured to perform translations of data between local memory operations and data packets transferred through one or more interconnects of the first type or the second type.

In some embodiments, each of the memory extension cards includes a switch configured to perform data bypassing for data received from one or more of the memory extension cards via one or more of the interconnects of the third type.

In some embodiments, the graphic access engine circuitry is further configured to: fetch a portion of structure data of the graph data from one or more of the memory extension cards; perform node sampling using the fetched portion of the structure data to select one or more sampled nodes; fetch a portion of attribute data of the graph data from one or more of the memory extension cards according to the selected one or more sampled nodes; and send the fetched portion of the attribute data of the graph to one or more of the processing units.

In some embodiments, each of the processing units is further configured to perform GNN processing for the graph using the fetched portion of the attribute data.

In some embodiments, each of the memory extension cards is implemented on a field programmable gate array (FPGA).

According to another aspect, a system comprises: a plurality of processing units, each configured to perform graph neural network (GNN) processing; and a plurality of memory extension cards, each configured to store graph data for the GNN processing, wherein: each of the plurality of processing units is communicatively coupled with three other processing units via one or more interconnects respectively; the plurality of processing units are communicatively coupled with the plurality of memory extension cards respectively; and each of the plurality of memory extension cards includes a graphic access engine circuitry configured to acceleratre GNN memory access.

In some embodiments, the plurality of processing units include a first processing unit, a second processing unit, a third processing unit, and a fourth processing unit; and the plurality of memory extension cards include a first memory extension card, a second memory extension card, a third memory extension card, and a fourth memory extension card; each of the first processing unit, the second processing unit, the third processing unit, and the fourth processing unit are communicatively coupled with each of the first memory extension card, the second memory extension card, the third memory extension card, and the fourth memory extension card respectively via an interconnect of a first type; the first processing unit is communicatively coupled with each of the third processing unit and the fourth processing unit via an interconnect of the first type; the second processing unit is communicatively coupled with each of the third processing unit and the fourth processing unit via an interconnect of the first type; the first processing unit is communicatively coupled with the second processing unit via two interconnects of a second type; and the third processing unit is communicatively coupled with the fourth processing unit via two interconnects of the second type.

In some embodiments, a form factor for each of the interconnects of the first type is two QSFP-DD ports, the two QSFP-DD ports having a bandwidth equal to or larger than 100 GB/s; a form factor for each of the interconnects of the second type is four Mini-SAS ports, the four Mini-SAS ports having a bandwidth equal to or larger than 50 GB/s; the first processing unit is communicatively coupled with the second processing unit via two parallel interconnects of the second type; and the third processing unit is communicatively coupled with the fourth processing unit via two parallel interconnects of the second type.

In some embodiments, each of the first, second, third, and fourth processing units includes a switch configured to perform data bypassing for data received from one or more of the other processing units via one or more of the interconnects of the first type or the second type.

In some embodiments, the graphic access engine circuitry is further configured to: fetch a portion of structure data of the graph data from one or more of the memory extension cards; perform node sampling using the fetched portion of the structure data to select one or more sampled nodes; fetch a portion of attribute data of the graph data from one or more of the memory extension cards according to the selected one or more sampled nodes; and send the fetched portion of the attribute data of the graph to one or more of the processing units.

In some embodiments, each of the memory extension cards is implemented on a field programmable gate array (FPGA).

According to yet another aspect, a memory extension card comprises one or more memories configured to store graph data for graph neural network (GNN) processing; one interconnect of a first type configured to connect the memory extension card with a processing unit configured to perform the GNN processing; two interconnects of a second type configured to connect the memory extension card with two other memory extension cards; and a graphic access engine circuitry configured to: fetch a portion of the structure data of the graph from the one or more memories or the two other memory extension cards; perform node sampling using the fetched portion of the structure data to select one or more sampled nodes; fetch a portion of the attribute data of the graph from the one or more memories or the two other memory extension cards according to the selected one or more sampled nodes; and send the fetched portion of the attribute data of the graph to the processing unit via the one interconnect of the first type, wherein a bandwidth of each of the two interconnects of the second type is half of a bandwidth of the one interconnect of the first type.

In some embodiments, the processing unit is communicatively coupled with three other processing units via either an interconnect of the first type or two interconnects of a third type.

In some embodiments, a form factor for each of the interconnects of the first type is two QSFP-DD ports, the two QSFP-DD ports having a bandwidth equal to or larger than 100 GB/s; a form factor for each of the interconnects of the second type is one QSFP-DD port, the one QSFP-DD port having a bandwidth equal to or larger than 50 GB/s; and a form factor for each of the interconnects of the third type is four Mini-SAS ports, the four Mini-SAS ports having a bandwidth equal to or larger than 50 GB/s.

According to yet another aspect, a method comprises: fetching, by an access engine circuitry in a memory extension card, a portion of structure data of a graph from one or more memories in the memory extension card or two other memory extension cards, wherein the memory extension card is communicatively coupled with a processing unit for graph neural network (GNN) processing via an interconnect of a first type, and is further communicatively coupled to each of the two other memory extension cards via an interconnect of a second type; performing, by the access engine circuitry, node sampling using the fetched portion of the structure data of the graph to select one or more sampled nodes; fetching, by the access engine circuitry, a portion of the attribute data of the graph from the one or more memories or the two other memory extension cards according to the selected one or more sampled nodes; sending, by the access engine circuitry, the fetched portion of the attribute data of the graph to the processing unit through the interconnect of the first type; and performing, by the processing unit, graph neural network (GNN) processing for the graph using the fetched portion of the attribute data of the graph.

In some embodiments, the processing unit is communicatively coupled with three other processing units via either an interconnect of the first type or two interconnects of a third type. In some embodiments, a form factor for each of the interconnects of the first type is two QSFP-DD ports, the two QSFP-DD ports having a bandwidth equal to or larger than 100 GB/s; a form factor for each of the interconnects of the second type is one QSFP-DD port, the one QSFP-DD port having a bandwidth equal to or larger than 50 GB/s; and a form factor for each of the interconnects of the third type is four Mini-SAS ports, the four Mini-SAS ports having a bandwidth equal to or larger than 50 GB/s.

In some embodiments, the method further comprises performing, by a switch in the memory extension card, data bypassing for data received from each of the two other memory extension cards via an interconnect of the second type.

In some embodiments, the memory extension card is implemented on a field programmable gate array (FPGA).

According to yet another aspect, a non-transitory computer-readable storage medium stores instructions that, when executed by one or more processors, cause the one or more processors to perform operations comprising: fetching, by an access engine circuitry in a memory extension card, a portion of structure data of a graph from one or more memories in the memory extension card or two other memory extension cards, wherein the memory extension card is communicatively coupled with a processing unit for graph neural network (GNN) processing via an interconnect of a first type, and is further communicatively coupled to each of the two other memory extension cards via an interconnect of a second type; performing, by the access engine circuitry, node sampling using the fetched portion of the structure data of the graph to select one or more sampled nodes; fetching, by the access engine circuitry, a portion of the attribute data of the graph from the one or more memories or the two other memory extension cards according to the selected one or more sampled nodes; sending, by the access engine circuitry, the fetched portion of the attribute data of the graph to the processing unit through the interconnect of the first type; and performing, by the processing unit, graph neural network (GNN) processing for the graph using the fetched portion of the attribute data of the graph.

These and other features of the systems, methods, and hardware devices disclosed, and the methods of operation and functions of the related elements of structure and the combination of parts and economies of manufacture will become more apparent upon consideration of the following description and the appended claims referring to the drawings, which form a part of this specification, where like reference numerals designate corresponding parts in the figures. It is to be understood, however, that the drawings are for illustration and description only and are not intended as a definition of the limits of the invention.

BRIEF DESCRIPTION OF THE DRAWINGS

FIG. 16 is an example method for accelerating GNN processing with one or more memory extension cards, according to some embodiments of this specification.

DETAILED DESCRIPTION

The specification is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present specification. Thus, the specification is not limited to the embodiments shown but is to be accorded the widest scope consistent with the principles and features disclosed herein.

Data may be structured or unstructured. For structured data, information may be arranged according to a pre-set data model or schema. For unstructured data, information may not be arranged using a preset-data model or a pre-defined manner. For example, a text file (e.g., emails, reports, etc.) may include information (e.g., individual letters or words) that does not have a pre-defined structure. As a result, the unstructured data may include irregularities and ambiguities that make it difficult to understand using traditional programs or data structures. Moreover, accessing unstructured data from a computer memory can involve a large number of random memory accessing, which can make memory accessing tedious and inefficient.

One way to represent unstructured data is by using graphs. A graph is a data structure comprising two components—nodes (or vertices) and edges. For example, a graph G may be defined as a collection of a set of nodes V and a set of edges E connecting the set of nodes. A node in a graph may have a set of features or attributes (e.g., a user profile in a graph representing a social network). A node may be defined as an adjacent node of another node, if they are connected by an edge. The graph may be a highly flexible data structure, as the graph may not require pre-defined rules to determine how many nodes it contains or how the nodes are connected by edges. Because the graph may provide great flexibility, it is one of the data structures that are widely used to store or represent unstructured data (e.g., text files). For example, the graph can store data that has a relationship structure, such as between buyers or products in an online shopping platform.

Figure 1:
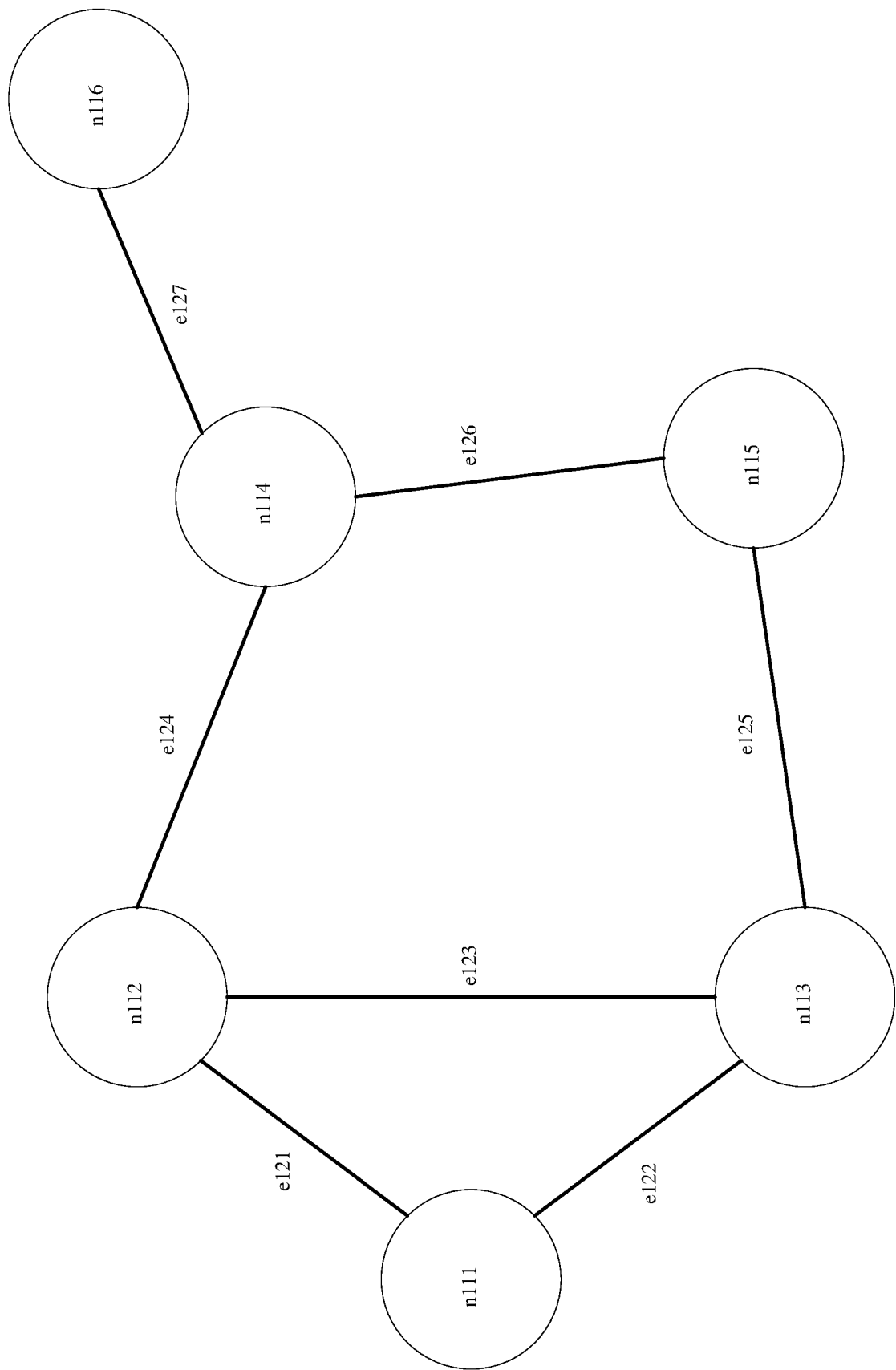
FIG. 1 is a schematic of an example graph, according to some embodiments of this specification.

FIG. 1 is a schematic of an example graph, according to some embodiments of this specification. As shown in FIG. 1, a graph 100 comprises nodes n111, n112, n113, n114, n115, and n116. Further, the graph 100 comprises edges e121, e122, e123, e124, e125, e126, and e127. Each of the nodes has one or more adjacent nodes. For example, nodes n112 and n113 are adjacent to node n111, since node n112 shares with node n111 edge e121 and node n113 shares with node n111 edge e122.

When storing a graph in computer memory, the nodes, edges, and attributes may be stored in various data structures. One way to store a graph is to separate the attribute data from the corresponding nodes. For example, node identifiers may be stored in an array, with each node identifier providing an address or a pointer that points to the location of the attribute data for the corresponding node. The attributes for all nodes may be stored together, and they may be accessed by reading the address or the pointer stored in the corresponding node identifiers. By separating the attribute data from the corresponding nodes, the data structure may be able to provide faster traversing access on the graph.

A graph neural network (GNN) is a type of neural network that may directly operate on a graph. The GNN may be more suitable than traditional neural networks (e.g., a convolutional neural network) for operations on a graph, since the GNN may be better equipped to accommodate the arbitrary size of the graph or the complex topology of the graph. The GNN may perform inference on data described in graph formats. The GNN is capable of performing node-level, edge-level, or graph-level prediction tasks.

GNN processing may involve GNN training and GNN inference, both of which may involve GNN computations. A typical GNN computation on a node (or vertex) may involve aggregating its neighbor's (direct neighbors or each neighbor's neighbors) features (e.g., attribute data) and then computing new activations of the node for determining a feature representation (e.g., feature vector) of the node. Therefore, GNN processing for a small number of nodes often requires input features of a significantly larger number of nodes. Taking all neighbors for message aggregation is too costly since the nodes needed for input features would easily cover a large portion of the graph, especially for real-world graphs that are colossal in size (e.g., with hundreds of millions of nodes with billions of edges).

To make GNN more practical for these real-word applications, node sampling is often adopted to reduce the number of nodes to be involved in the message/feature aggregation. For example, positive sampling and negative sampling may be used to determine the optimization objective and the resulted variance in the GNN processing. For a given root node whose feature representation is being computed, the positive sampling may sample those graph nodes that have connections (direct or indirect) via edges with the root node (e.g., connected to and within a preset distance from the root node); the negative sampling may sample those graph nodes that are not connected via edges with the root graph node (e.g., outside of the preset distance from the root node). The positively sampled nodes and the negatively sampled nodes may be used to train the feature representation of the root node with different objectives.

Figure 2A:
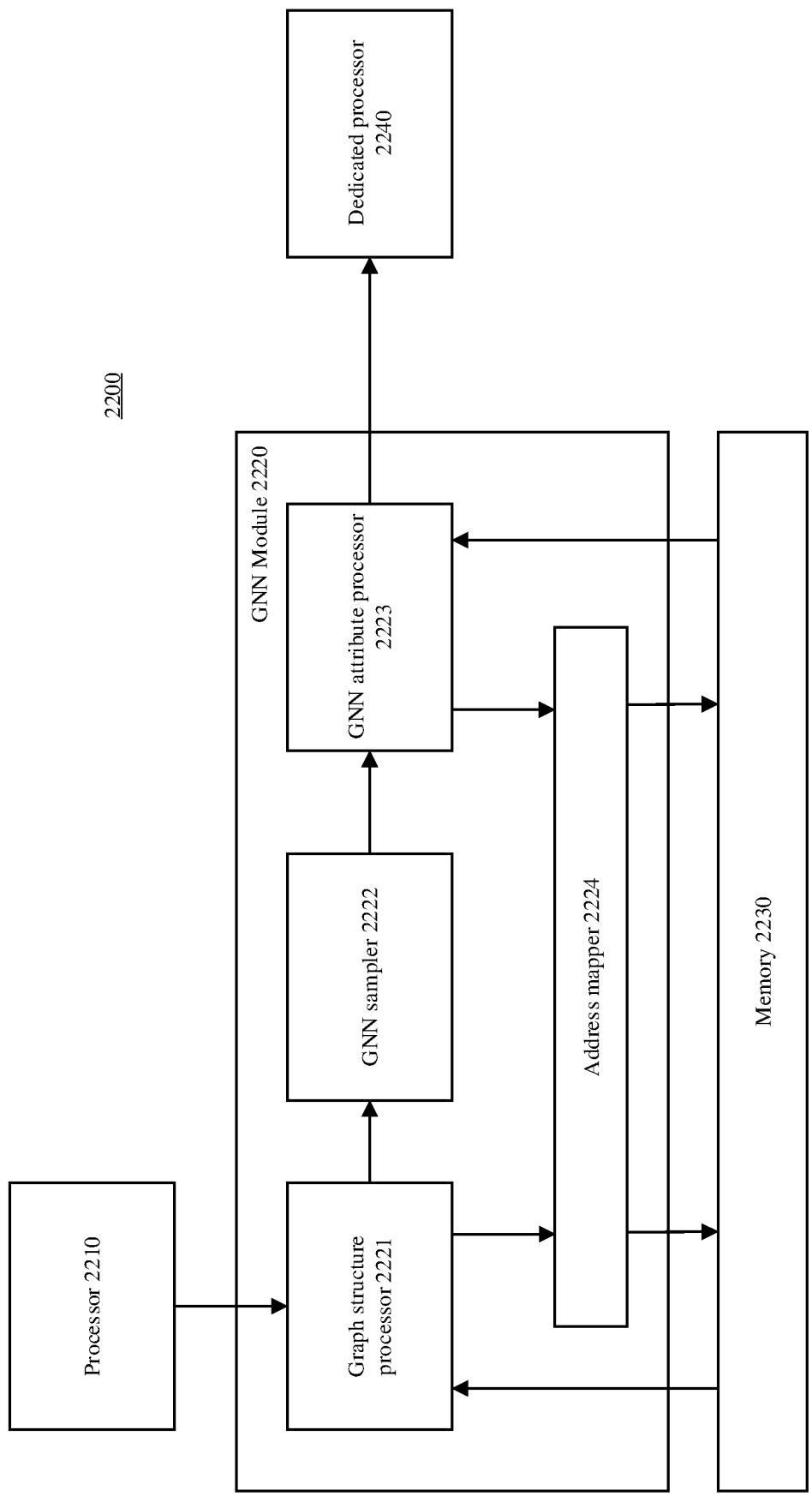
FIG. 2A is a schematic of an example system using GNN accelerator architecture, according to some embodiments of this specification.

To perform GNN computations, a system may retrieve graph data from a memory, and send the data to one or more processors for processing. FIG. 2A is a schematic of an example system using GNN accelerator architecture, according to some embodiments of this specification. As shown in FIG. 2A, a system 2200 comprises one or more processors 2210, a GNN accelerator 2220, a memory 2230, and one or more dedicated processors 2240. In some embodiments, the one or more processors 2210 comprises one or more central processing units (CPU). In some embodiments, the one or more dedicated processors 2240 may include one or more CPUs, one or more graphic processing units (GPU), one or more tensor processing units (TPU), one or more neural processing units (NPU), one or more dedicated graph neural network processing units, etc. In some embodiments, the memory 2230 may include Synchronous Dynamic Random-Access Memory (SDRAM), such as a Double Data Rate (DDR) SDRAM.

As shown in FIG. 2A, the GNN accelerator 2220 may receive instructions and information on a GNN from the one or more processors 2210, and extract data related to the GNN from the memory 2230. After receiving the data from the memory 2230, the GNN accelerator 2220 may preprocess the data, and send the preprocessed data to the one or more dedicated processors 2240 for further processing.

In some embodiments, as shown in FIG. 2A, the GNN accelerator 2220 may include a graph structure processor 2221, a GNN sampler 2222, a GNN attribute processor 2223, and an address mapper 2224. The graph structure processor 2221 may be configured to receive instructions and information on the GNN from the one or more processors 2210, and fetch information on one or more root nodes and their edges from the memory 2230. The graph structure processor 2221 may then send the fetched information to the GNN sampler 2222.

The GNN sampler 2222 may be configured to select, according to the edge information of the one or more root nodes, one or more sampled nodes for GNN processing. In some embodiments, the GNN sampler 2222 may select the one or more sampled nodes according to positive sampling or negative sampling. For example, based on the positive sampling, the one or more sampled nodes may be selected from nodes that have a connection via edges with the one or more root nodes (e.g., adjacent to the one or more root nodes). Based on the negative sampling, the one or more sampled nodes may be selected from nodes that are not directly connected via edges with the one or more root nodes (e.g., not adjacent or close to the one or more root nodes). In some embodiments, the positive sampling may select from the neighboring nodes of the root node that are connected to and within a preset distance from the root node. The connection may be a direct (one edge between the source node to the destination node) or indirect (multiple edges from the source node to the destination node) connection. The "preset distance" may be configured according to the implementation. For example, if the preset distance is one, it means only the directly connected neighboring nodes are selected for positive sampling. If the preset distance is infinity, it means that the nodes are not connected, whether directly or indirectly. The negative sampling may select from nodes that are outside the preset distance from the root node. It is appreciated that the sampled nodes may be selected using any algorithms other than the positive sampling and the negative sampling.

Having selected the sampled nodes, the GNN sampler 2222 may send the selection information of the sampled nodes to the GNN attribute processor 2223. Based on the information of the sampled nodes, the GNN attribute processor 2223 may be configured to fetch from the memory 2230 information of the sampled nodes. In some embodiments, the information of the sampled nodes may include one or more features or attributes of each of the sampled nodes (also called attribute data). The GNN attribute processor 2223 may be further configured to send the fetched information of the sampled nodes and the information of the one or more root nodes and their edges to the dedicated processors 2240. The dedicated processors 2240 may perform GNN processing based on the information received from the GNN attribute processor 2223.

In some embodiments, the graph structure processor 2221 and the GNN attribute processor 2223 may fetch information from the memory 2230 using the address mapper 2224. The address mapper may be configured to provide hardware address information in the memory 2230 based on information of nodes and edges. For example, a root node as a part of an input GNN may be identified using an identifier n111 (e.g., node n111 of FIG. 1). If the graph structure processor 2221 intends to fetch information of the node n111 (e.g., attribute data of the node n111), the graph structure processor 221 may provide the identifier n111 to the address mapper 224, and the address mapper 2224 may determine a physical address in the memory 2230 where the information for the node n111 (e.g., the attribute data of the node n111) is stored. In some embodiments, the address mapper 2224 may also determine one or more physical addresses in the memory 2230 where information on the edges of the node n111 is stored (e.g., edges e121 and e122 of FIG. 1).

Figure 2B:
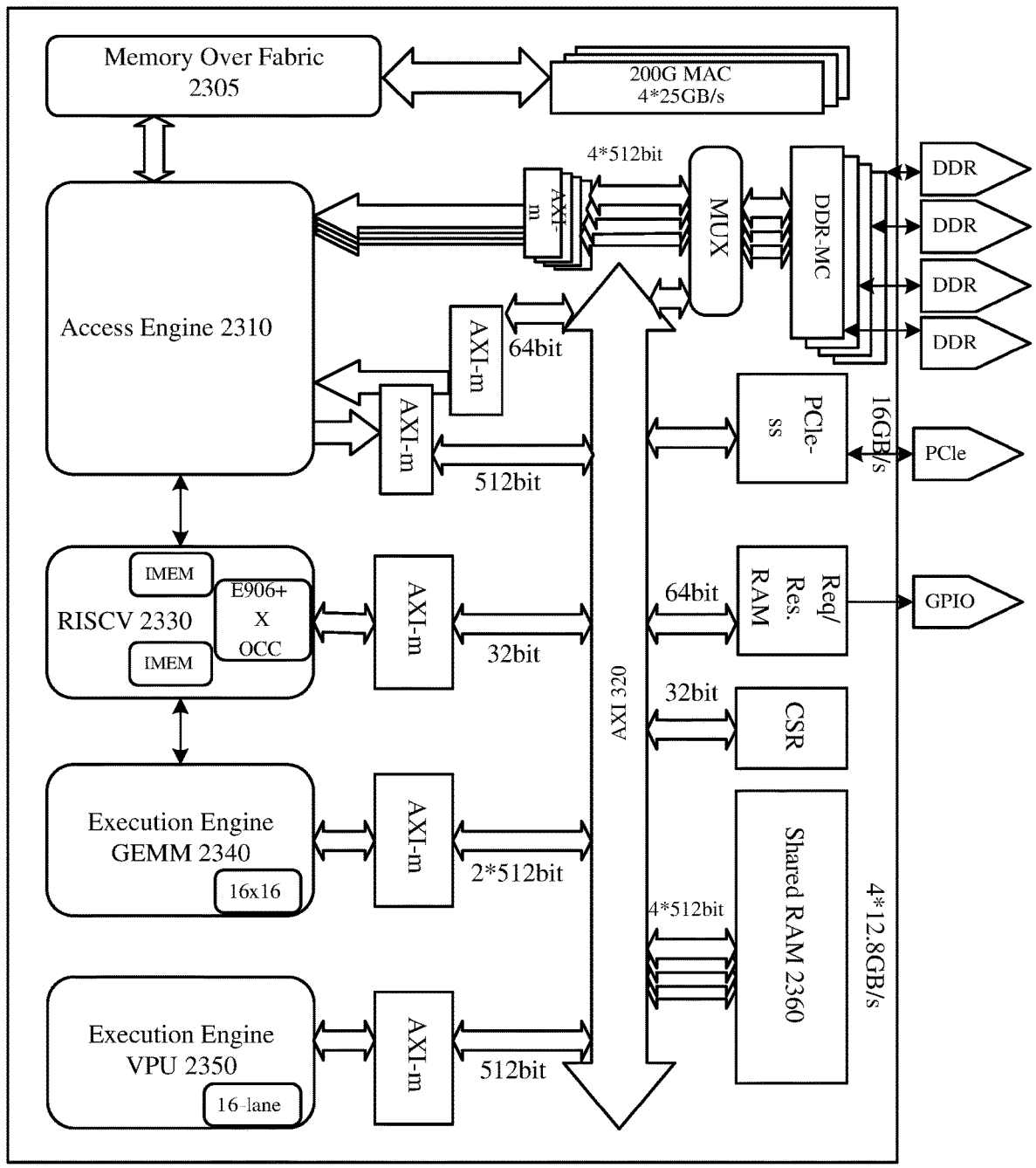
FIG. 2B is a schematic of an example system for accelerating GNN performance, according to some embodiments of this specification.

The system 2200 shown in FIG. 2A may be used to accelerate GNN memory access for different systems in accelerating GNN performance. FIG. 2B is a schematic of an example system for accelerating GNN performance, according to some embodiments of this specification. As shown in FIG. 2B, an acceleration system 2300 comprises a memory over fabric (MoC) 2305, an access engine 2310, a RISC-V 2330, a General Matrix Multiply (GEMM) execution engine 2340, and a vector processing units (VPU) execution engine 2350. The access engine 2310 shown in FIG. 2B may be similar to the GNN module 2220 shown in FIG. 2A. The access engine 2310 may be configured to retrieve, from memory (e.g., DDRs as shown in FIG. 2B), data needed for performing GNN calculations. For example, the access engine 2310 may retrieve node identifiers, edge identifiers, and attribute data corresponding to the node identifiers. The data retrieved by the access engine 2310 may be provided to the execution engines (e.g., the GEMM execution engine 2340 or the VPU execution engine 2350) or processors for GNN-related calculations. As shown in FIG. 2B, both types of engines may perform specific GNN-related calculations in an accelerated manner.

Figure 2C:
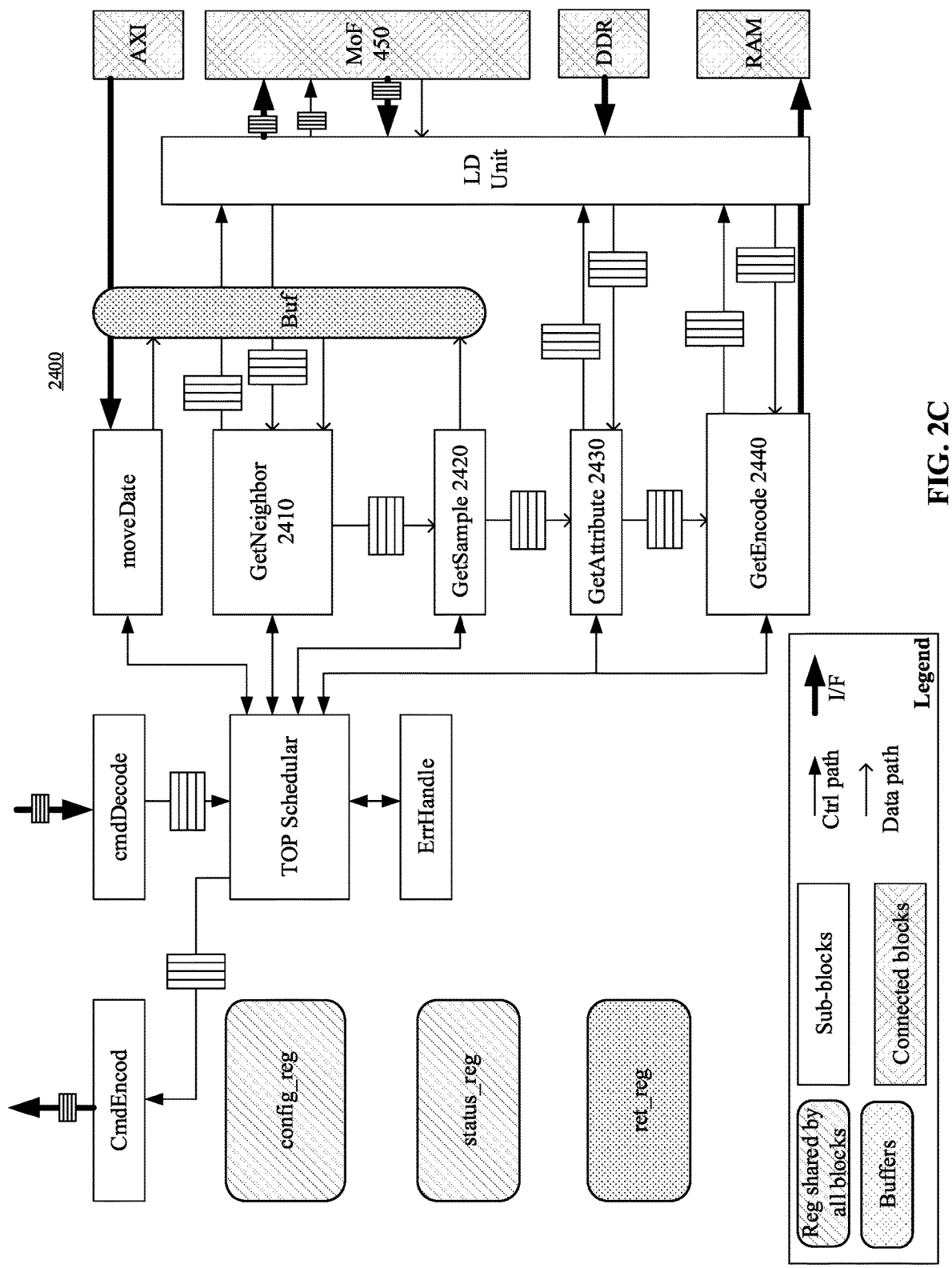
FIG. 2C is a schematic of an example GNN access engine, according to some embodiments of this specification.

Although the system 2300 may include accelerated engines and processors to speed up GNN-related calculations, it is the access engine 2310 that may become a bottleneck for the overall performance of the system 2300, since the data retrieval performed by the access engine may be slower than the execution engines performing data processing. FIG. 2C is a schematic of an example GNN access engine, according to some embodiments of this specification. It is appreciated that an access engine 2400 shown in FIG. 2C may be similar to the access engine 2310 shown in FIG. 2B. As shown in FIG. 2C, the access engine 2400 may include a GetNeighbor module 2410, a GetSample module 2420, a GetAttribute module 2430, and a GetEncode module 2440.

In some embodiments, the GetNeighbor module 2410 is configured to access or identify adjacent nodes for an input node identifier. For example, similar to the graph structure processor 2221 shown in FIG. 2A, the GetNeighbor module 2410 may receive instructions and information on the GNN, and fetch information on one or more nodes, their edges, and their neighbors (adjacent nodes) from DDRs (e.g., corresponding to the memory 2230 of FIG. 2A). The GetNeighbor module 2410 may then send the fetched information to the GetSample module 2420 (e.g., corresponding to the GNN Sampler 2222 of FIG. 2A).

In some embodiments, the GetSample module 2420 is configured to receive information on one or more nodes from the GetNeighbor module 2410 and perform node sampling on the one or more nodes for GNN processing. For example, similar to the GNN sampler 2222 shown in FIG. 2A, The GetSample module 2420 may be configured to select, according to the edge information of the one or more nodes, one or more sampled nodes for GNN processing. In some embodiments, the GNN sampler 2222 may select the one or more sampled nodes according to positive sampling and/or negative sampling. Having selected the sampled nodes, the GetSample module 2420 may send the selection information of the sampled nodes to the GetAttribute module 2430.

In some embodiments, the GetAttribute module 2430 may be configured to receive information of selected or sampled nodes from the GetSample module 2420 and fetch attribute information on the sampled nodes from memory (e.g., DDRs shown in FIG. 2C or memory 2230 shown in FIG. 2A). For example, similar to the GNN attribute processor 2223, the GetAttribute module 2430 may be configured to fetch from the memory 2230 attribute data of the sampled nodes based on the received sampled nodes (e.g., sampled node identifiers). In some embodiments, the GetAttribute module may need to fetch attribute information on the sampled nodes from remote locations. For example, the GetAttribute module may need to fetch the attribute information from other boards. As a result, the GetAttribute module may utilize a memory over fabric (MoF) module 2450 to fetch the attribute information from remote locations (e.g., on other boards). In some embodiments, the attribute data of the sampled nodes may include one or more features of each of the sampled nodes.

A graphics processing unit (GPU) is a well-known device that performs the computations necessary to populate a frame buffer which, in turn, is used to display an image on a screen. A central processing unit (CPU) offloads the task of populating the frame buffer, which can be computationally intensive, to the GPU, thereby freeing the CPU to perform other tasks in a timely manner.

A general-purpose graphics processing unit (GPGPU) is an extension of a GPU in that a GPGPU can be programmed to perform other compute-intensive (non-graphics processing) operations. In artificial intelligence (AI) and machine learning applications (e.g., GNN processing), a CPU is often paired with a number of GPGPUs, e.g., 100 GPGPUs, that perform convolution type operations in parallel. In this specification, GPUs and GPGPUs are used interchangeably to describe GPUs that can be configured to perform general-purpose computations, unless otherwise specified.

A GPGPU can have a processor and a memory that is coupled to the processor. In many AI and machine learning applications (e.g., GNN processing), the memory has to be large and very fast. As a result, the memory in a GPGPU in an AI/machine learning setting is commonly implemented with a large and very fast memory known as a high bandwidth memory (HBM).

A typical HBM includes a number of dynamic random-access memory (DRAM) dies that are vertically stacked on top of each other to provide a large storage capacity, e.g., 4 GB, 24 GB, and 64 GB), with a small form factor. In addition, each DRAM die can include two 128-bit data channels to provide a high bandwidth.

There are a number of issues with conventional HBM designs. For example, the GPGPU memory effectively has a maximum capacity which, in turn, limits the operations that the GPGPU can perform in a timely manner. A maximum capacity effectively exists because it is increasingly more difficult to vertically stack dies on top of each other, thereby effectively limiting both the number of dies that can be stacked up to form an HBM and the maximum capacity of the HBM. In addition, each die in an HBM is often fabricated with the largest reticle, which limits the maximum size and capacity of the die. This issue becomes progressively worse as the amount of data to be processed continues to grow.

Further, in addition to an effective maximum capacity, all or a portion of another memory, such as a portion of the CPU memory, may not be used as an extension of the GPGPU memory (HBM) to provide additional very fast memory capacity. This is because the GPGPU would be coupled to the extension (e.g., CPU) memory by way of a peripheral component interconnect express (PCIe) bus. Accessing data across a PCIe bus can be 100 times slower than accessing the data in an HBM, which is far too slow for many AI/machine learning applications. Current HBM-based designs are difficult to scale up due to the physical constraints, and multi-GPU designs (e.g., a scaling out solution) may cause serious waste on computational resources.

Thus, since the GPGPU memory (HBM) effectively has a maximum capacity, and further since all or a portion of another memory may not be used as an extension of the GPGPU memory (HBM) to provide additional very fast memory capacity, there is a need to increase the capacity of the GPGPU memory and provide near-memory operations.

Numerous electronic technologies such as digital computers, calculators, audio devices, video equipment, and telephone systems facilitate increased productivity and cost reduction in analyzing and communicating data and information in most areas of business, science, education, and entertainment. Electronic components can be used in a number of important applications (e.g., medical procedures, vehicle aided operation, financial applications, etc.) and frequently these activities involve processing and storing large amounts of information. These applications typically involve large amounts of information processing. Handling (e.g., storing, processing, communicating, etc.) the large amounts of information can be problematic and difficult.

In many applications (e.g., applications processing GNN on graphs such as the graph shown in FIG. 1), it is important for systems to process information rapidly and accurately, and the ability to rapidly and accurately process information is often dependent on the access to the information. Traditional systems typically have difficulty sorting and processing large amounts of information, particularly in parallel processing environments. Providing too little memory is usually very detrimental and can result in complete application failure. Conventional attempts at providing a large amount of dedicated memory at each parallel processing resource with enough dedicated memory capability to store all the information can be prohibitively expensive. In addition, each processing resource typically has different memory storage access needs at different times and much of the memory resources can be idle or essentially wasted. Traditional attempts at sharing memory resources often give rise to communication issues and can considerably slow down access to the information by a processing resource, resulting in considerable performance limitations and deterioration.

Figure 2D:
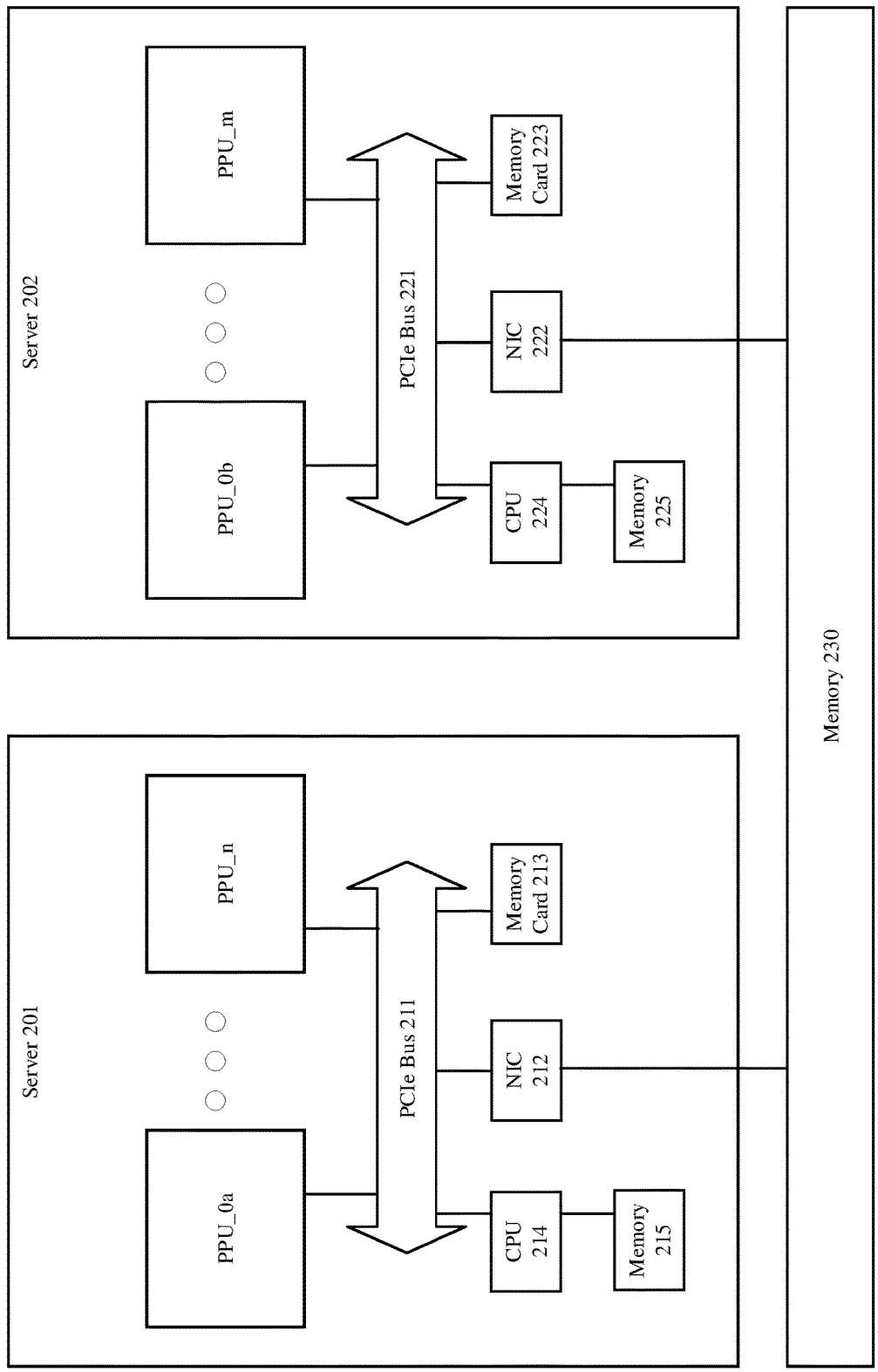
FIG. 2D is a schematic of an example system that shares memory resources, according to some embodiments of this specification.

FIG. 2D is a schematic of an example system 200 that shares memory resources, according to some embodiments of this specification. In general, the system 200 includes a number of servers, and each server includes a number of parallel computing units. As shown in FIG. 2D, the system 200 includes servers 201 and 202. The server 201 includes parallel processing units (PPUs) PPU_0a to PPU_0n, Peripheral Component Interconnect Express (PCIe) bus 211, memory card 213, a network interface controller or card (NIC) 212, and a host CPU 214. Each of the PPUs includes elements such as a processing core or memory (not shown on FIG. 2D). In some embodiments, a PPU can be a neural processing unit (NPU) or a GPU. In some embodiments, a plurality of NPUs or GPUs can be arranged in a parallel configuration. The PCIe bus 211 can be communicatively coupled to the PPU_0a through PPU_n, the memory card 213, the host CPU 214, and the NIC 212, which is communicatively coupled to a network 230. The host CPU 214 can be communicatively coupled to the memory 215 (e.g., RAM, DRAM, DDR4, DDR5, etc.). The PCIe bus 221 can be communicatively coupled to the PPU_0b through PPU_n, the memory card 223, a host CPU 224, and an NIC 222, which can be communicatively coupled to the network 230. In some embodiments, network 230 can be an ethernet network.

In some embodiments, the system 200 incorporates unified memory addressing space using, for example, the partitioned global address space (PGAS) programming model. In many applications, a particular PPU may need to access information stored on a memory card of the system. Thus, in the example of FIG. 1, the PPU-0a on the server 201 may need to access information stored on the memory card 213 and 223. To access information on memory card 213, the information can be communicated via the PCIe bus 211 somewhere in the system, and depending on where in the system. For example, to write data from PPU_0a to the memory card 213 on the server 201, the data is sent from PPU_0a over the PCIe bus 211 to the memory card 213; and to write data from PPU_0a on the server 201 to memory card 223 on the server 202, the data is sent from PPU_0a over the PCIe bus 211 to the NIC 221, then over the network 230 to the NIC 222, then over the PCIe bus 212 to memory card 223.

The system 200 can be used for applications such as graph analytics and graph neural networks, and more specifically for applications such as online shopping engines, social networking, recommendation engines, mapping engines, failure analysis, network management, search engines, etc. Such applications execute a tremendous number of memory access requests (e.g., read and write requests), and as a consequence also transfer (e.g., read and write) a tremendous amount of data for processing. While PCIe bandwidth and data transfer rates are considerable, they are nevertheless limiting for such applications. As a practical matter, PCIe is typically simply too slow and its bandwidth is too narrow for such applications. The slow and narrow bandwidth of the conventional PCIe bus approaches can also have the effect of limiting conventional attempts at flexibly configuring and extending memory capabilities.

Figure 3:
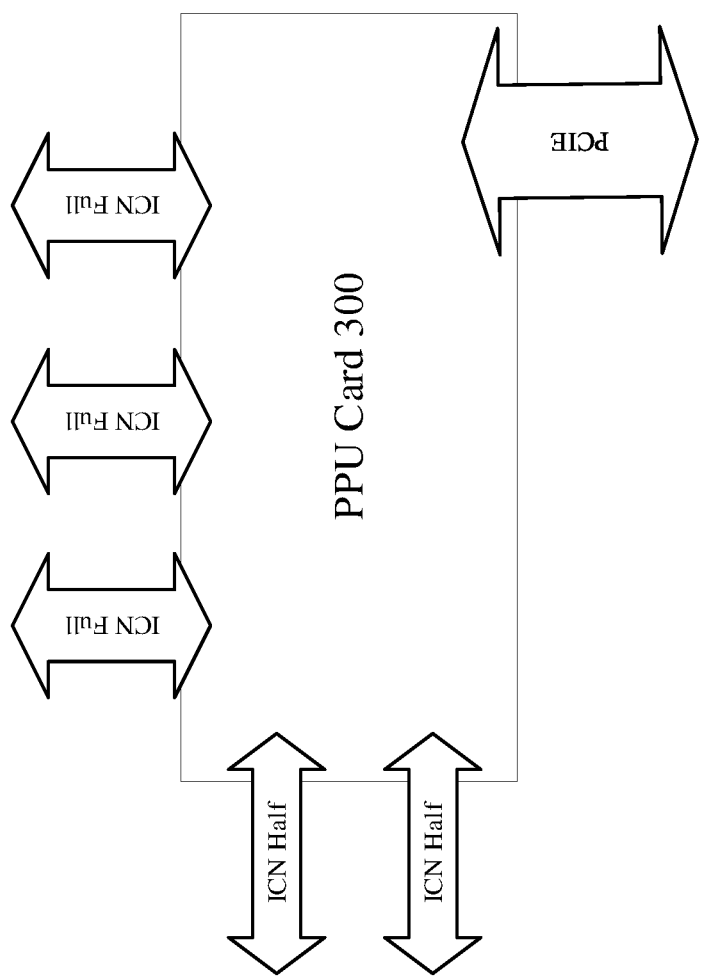
FIG. 3 is a schematic of an example parallel processing unit (PPU) card, according to some embodiments of this specification.

Embodiments of this specification provide methods and systems to facilitate more efficient memory accessing among PPUs. FIG. 3 is a schematic of an example PPU card, according to some embodiments of this specification. The schematic in FIG. 3 is for illustrative purposes only, and the PPU card 300 shown in FIG. 3 may have fewer, more, and alternative components and connections depending on the implementation. In some embodiments, the PPU card 300 can be implemented on a field programmable gate array (FPGA).

The PPU card 300 can be configured to provide processing power. In some embodiments, the PPU card 300 can include one or more PPUs. It is appreciated that the PPU card 300 can include any processing units, not just the PPUs. For example, the PPU card 300 can include one or more CPUs, one or more GPUs or GPGPUs, one or more tensor processing units (TPU), one or more neural processing units (NPU), or one or more dedicated graph neural network processing units. In some embodiments, the PPU card is similar to the dedicated processor 2240 of FIG. 2. As shown in FIG. 3, the PPU card 300 can be configured to include a plurality of connections. For example, as shown in FIG. 3, the PPU card 300 can include 3 interconnect network (ICN) full-speed links or interconnects and 2 half-speed links or interconnects. In some embodiments, one or more of the ICN full-speed links can be bi-directional (e.g., 100 GB/s), and one or more of the ICN half-speed links can be bi-directional (e.g., 50 GB/s). In some embodiments, one form factor for the ICN full-speed links is an ICN bridge (e.g., similar to an Nvidia bridge or an NVLINK bridge) or a QSFP-DD port (e.g., 2 QSFP-DD ports per one ICN full-speed link). In some embodiments, one form factor for the ICN half-speed links is a Mini-SAS connector (e.g., 4 Mini-SAS ports per one ICN half-speed link). In some embodiments, the PPU card 300 is configured to include a PCIe connection.

Figure 4A:
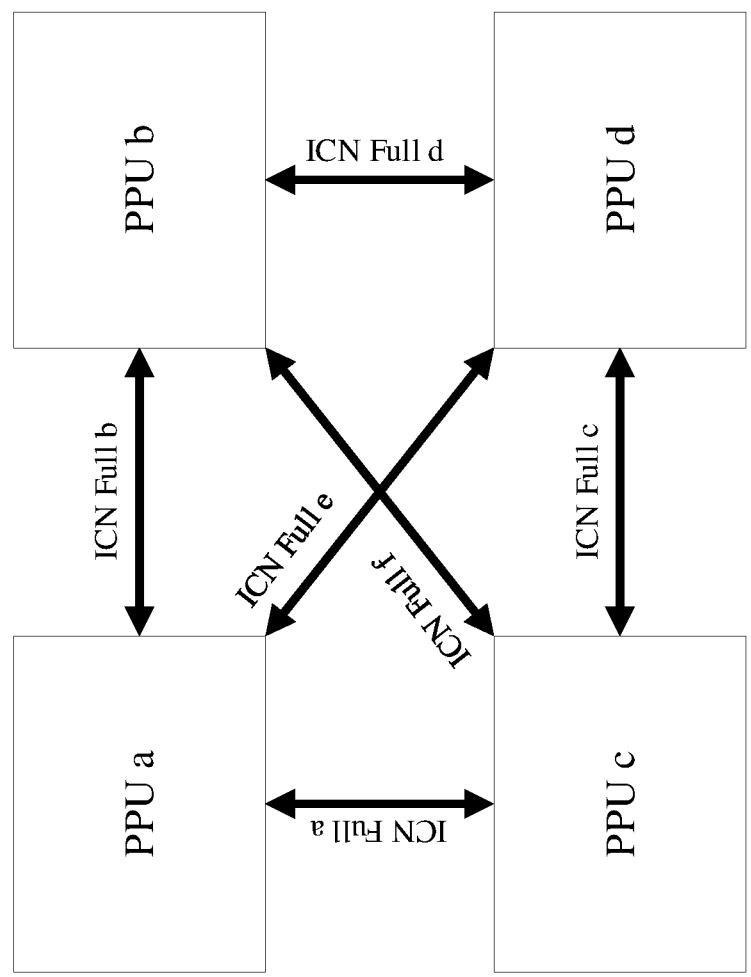
FIG. 4A is a schematic of an example system of connected PPU cards, according to some embodiments of this specification.

FIG. 4A is a schematic of an example system of connected PPU cards, according to some embodiments of this specification. The schematic in FIG. 4A is for illustrative purposes only, and the system 400 shown in FIG. 4A may have fewer, more, and alternative components and connections depending on the implementation.

As shown in FIG. 4A, the system 400 can comprise 4 PPUs, namely PPU a, PPU b, PPU c, and PPU d. In some embodiments, each of the PPUs a-d is similar to the PPU card 300 shown in FIG. 3. For example, each of the PPUs a-d can include 3 ICN full-speed links and 2 half-speed links. As shown in FIG. 4A, each of the PPUs a-d is connected to each of the other PPUs via an ICN full-speed link. For example, the PPU a is connected to the PPU b via an ICN full-speed link b, to the PPU c via an ICN full-speed link a, and to the PPU d via an ICN full-speed link e. As a result, as shown in FIG. 4A, there are 6 ICN full-speed links a-f connecting each pair of the PPUs a-d. The ICN full-speed links shown in FIG. 4A can help each of the PPUs to access resources (e.g., memory resources) of other PPUs with efficiency. As a result, the memory capacity is no longer limited to a single PPU, and the data transmission between PPUs can be improved.

Figure 4B:
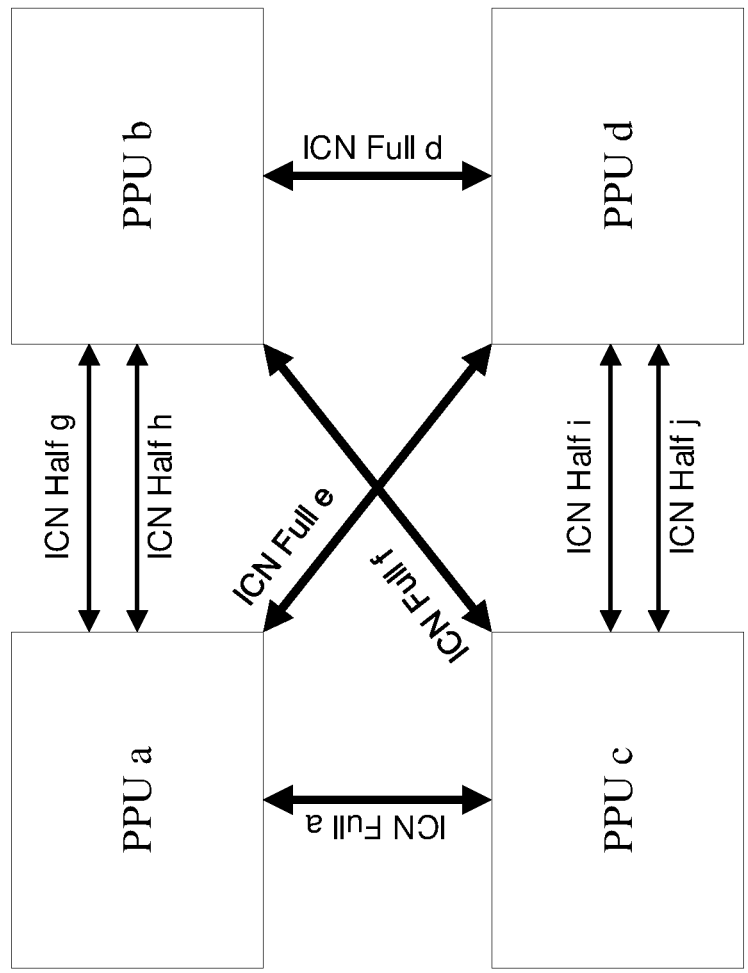
FIG. 4B is a schematic of another example system of connected PPU cards, according to some embodiments of this specification.

FIG. 4B is a schematic of another example system of connected PPU cards, according to some embodiments of this specification. The schematic in FIG. 4B is for illustrative purposes only, and the system 410 shown in FIG. 4B may have fewer, more, and alternative components and connections depending on the implementation.

As shown in FIG. 4B, the system 410 can comprise 4 PPUs, namely PPU a, PPU b, PPU c, and PPU d. In some embodiments, each of the PPUs a-d is similar to the PPU card 300 shown in FIG. 3. For example, each of the PPUs a-d can include 3 ICN full-speed links and 2 half-speed links. As shown in FIG. 4B, each of the PPUs a-d is connected to each of the other PPUs via an ICN full-speed link or 2 ICN half-speed links. For example, the PPU a is connected to the PPU b via an ICN half-speed g and an ICN half-speed h (e.g., the two half-speed interconnects may be configured in parallel to collectively provide a full-speed connection), to the PPU c via an ICN full-speed link a, and to the PPU d via an ICN full-speed link e. As a result, as shown in FIG. 4B, there are 4 ICN full-speed links a, d, e, and f and 4 ICN half-speed links g, h, i, and j connecting each pair of the PPUs a-d. The ICN full-speed links and half-speed links shown in FIG. 4B can help each of the PPUs to access resources (e.g., memory resources) of other PPUs with efficiency. As a result, the memory capacity is no longer limited to a single PPU, and the data transmission between PPUs can be improved.

Figure 4C:
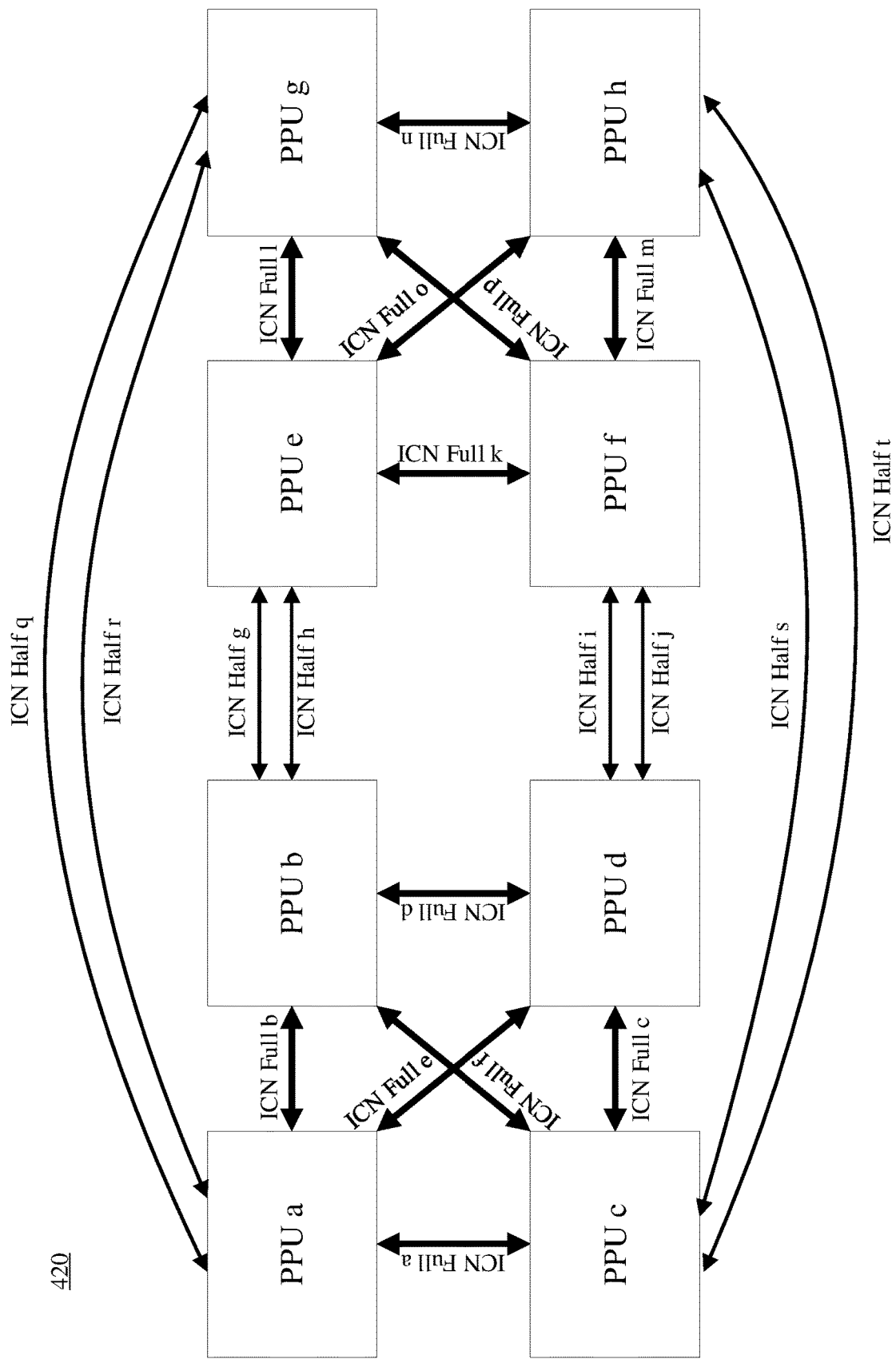
FIG. 4C is a schematic of another example system of connected PPU cards, according to some embodiments of this specification.

FIG. 4C is a schematic of another example system of connected PPU cards, according to some embodiments of this specification. The schematic in FIG. 4C is for illustrative purposes only, and the system 420 shown in FIG. 4C may have fewer, more, and alternative components and connections depending on the implementation.

As shown in FIG. 4C, the system 420 can comprise 8 PPUs, namely PPU a, PPU b, PPU c, PPU d, PPU e, PPU f, PPU g, and PPU h. In some embodiments, each of the PPUs a-h is similar to the PPU card 300 shown in FIG. 3. For example, each of the PPUs a-h can include 3 ICN full-speed links and 2 half-speed links. As shown in FIG. 4C, each of the PPUs a-d is connected to some of the other PPUs via an ICN full-speed link or 2 ICN half-speed links. For example, the PPU a is connected to the PPU b via an ICN full-speed link b, to the PPU c via an ICN full-speed link a, to the PPU d via an ICN full-speed link e, and to the PPU g via an ICN half-speed q and an ICN half-speed r. As a result, as shown in FIG. 4C, there are 12 ICN full-speed links a, b, c, d, e, f, k, l, m, n, o, and p and 8 ICN half-speed links g, h, i, j, q, r, s, and t connecting many pairs of the PPUs a-d. Therefore, each of the PPUs in the system 420 can access resources (e.g., memory resources) of any of the other PPUs via at most 2 hops. For example, although there is no direct connection connecting the PPU a and the PPU e, the PPU a can access the resources (e.g., memory resources) in the PPU e via ICN full-speed link b and 2 ICN half-speed links g and h. The ICN full-speed links and half-speed links shown in FIG. 4C can help each of the PPUs to access resources of other PPUs with efficiency. As a result, the memory capacity is no longer limited to a single PPU, and the data transmission between PPUs can be improved.

In some embodiments, each of the PPUs can include an ICN switch configured to facilitate data accessing of resources in each PPU. For example, the PPU a can access the memory resource in the PPU e via the ICN full-speed link b and the 2 ICN half-speed links g and h, using an ICN switch located in the PPU b.

Figure 5:
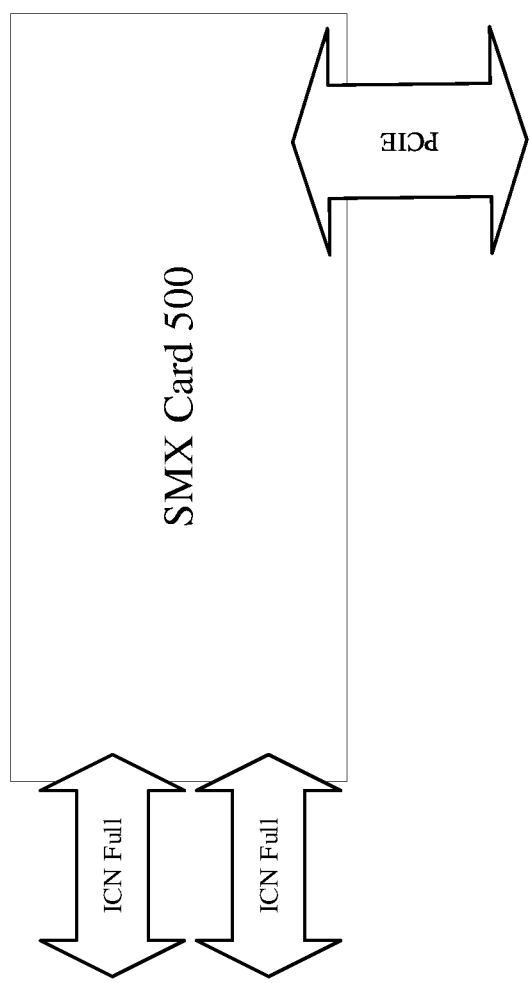
FIG. 5 is a schematic of an example smart memory extension (SMX) card, according to some embodiments of this specification.

In some embodiments, the system further comprises one or more memory extension cards. FIG. 5 is a schematic of an example smart memory extension card, according to some embodiments of this specification. The schematic in FIG. 5 is for illustrative purposes only, and the smart memory extension (SMX) card 500 shown in FIG. 5 may have fewer, more, and alternative components and connections depending on the implementation. In some embodiments, the SMX card 500 can be implemented on an FPGA.

The SMX card 500 shown in FIG. 5 can be configured to provide additional memory capacity for processors (e.g., the PPU card 300 shown in FIG. 3 and the PPUs shown in FIG. 4A, FIG. 4B, and FIG. 4C) and can be communicatively coupled with the processors. In some embodiments, the SMX card 500 comprises one or more memories (e.g., the memory 2230 of FIG. 2A, the DDRs shown in FIG. 2B or FIG. 2C, or solid-state drives (SSDs)), and the memories can be configured to store graph data. As shown in FIG. 5, the SMX card 500 can be configured to include a plurality of connections. For example, as shown in FIG. 5, the SMX card 500 can include 2 ICN full-speed links. In some embodiments, one or more of the ICN full-speed links can be bi-directional (e.g., 100 GB/s). In some embodiments, one form factor for the ICN full-speed links is a QSFP-DD port (e.g., 2 QSFP-DD ports per one ICN full-speed link). In some embodiments, the SMX card 500 also includes one or more converting breakout cables between the ICN bridge and the one or more QSFP-DD ports. In some embodiments, the SMX card 500 is configured to include a PCIe connection.

Figure 6A:
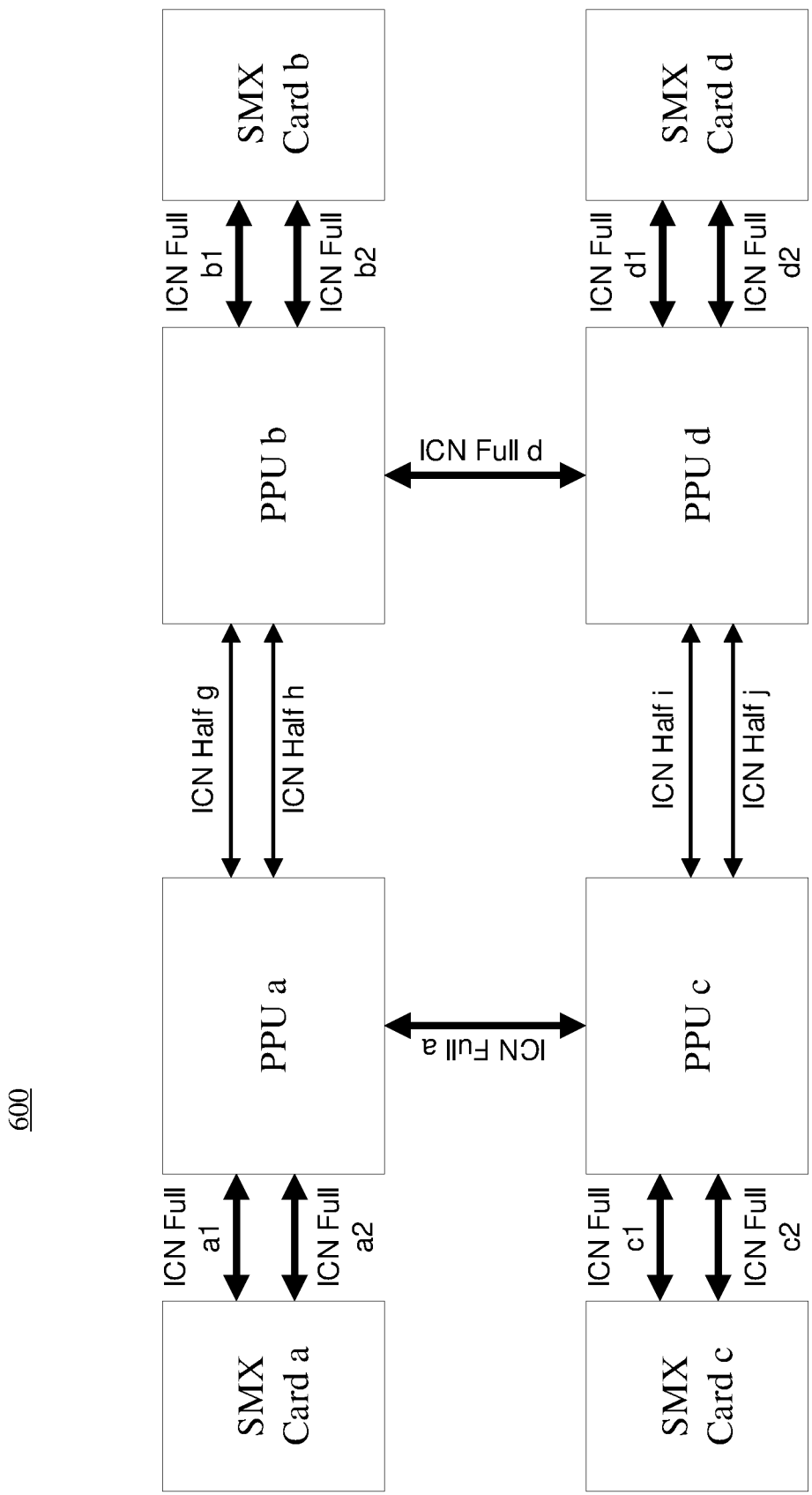
FIG. 6A is a schematic of an example system of connected PPU cards with smart memory extension cards, according to some embodiments of this specification.

FIG. 6A is a schematic of an example system of connected PPU cards with smart memory extension cards, according to some embodiments of this specification. The schematic in FIG. 6A is for illustrative purposes only, and the system 600 shown in FIG. 6A may have fewer, more, and alternative components and connections depending on the implementation.

As shown in FIG. 6A, the system 600 can comprise 4 PPUs, namely PPU a, PPU b, PPU c, and PPU d. In some embodiments, each of the PPUs a-d is similar to the PPU card 300 shown in FIG. 3. For example, each of the PPUs a-d can include 3 ICN full-speed links and 2 half-speed links. As shown in FIG. 6A, each of the PPUs a-d is connected to one or more of the other PPUs via an ICN full-speed link or 2 ICN half-speed links. For example, the PPU a is connected to the PPU b via 2 ICN half-speed links g and h, and to the PPU c via an ICN full-speed link a. In some embodiments, each of the PPUs a-d can be connected to an SMX card. For example, as shown in FIG. 6A, the PPU a is connected to an SMX card a via 2 ICN full-speed links a1 and a2, the PPU b is connected to an SMX card b via 2 ICN full-speed links b1 and b2, the PPU c is connected to an SMX card c via 2 ICN full-speed links c1 and c2, and the PPU d is connected to an SMX card d via 2 ICN full-speed links d1 and d2. In some embodiments, each of the SMX cards a-d shown in FIG. 6A is similar to the SMX card 500 of FIG. 5. As shown in FIG. 6A, there are 10 ICN full-speed links and 4 ICN half-speed links. Therefore, each of the PPUs in the system 600 can access resources (e.g., memory resources) of any of the other PPUs or SMX cards via at most 3 hops. For example, although there is no direct link connecting the PPU a and the SMX card d, the PPU a can access the memory resource in the SMX card d via 2 ICN half-speed links g and h, 1 ICN full-speed link d, and 2 ICN full-speed links d1 and d2. In some embodiments, each of the PPUs can comprise an ICN switch configured to facilitate data accessing of resources. For example, the PPU a can access the memory resource in the SMX card d via the 2 ICN half-speed links g and h, the 1 ICN full-speed link d, and the 2 ICN full-speed links d1 and d2, using ICN switches located in the PPU b and the PPU d. The ICN full-speed links and half-speed links shown in FIG. 6A can help each of the PPUs to access resources (e.g., memory resources) of other PPUs and SMX cards with efficiency. As a result, the memory capacity is no longer limited to a single PPU, and the data transmission between PPUs and the SMX cards can be improved.

Figure 6B:
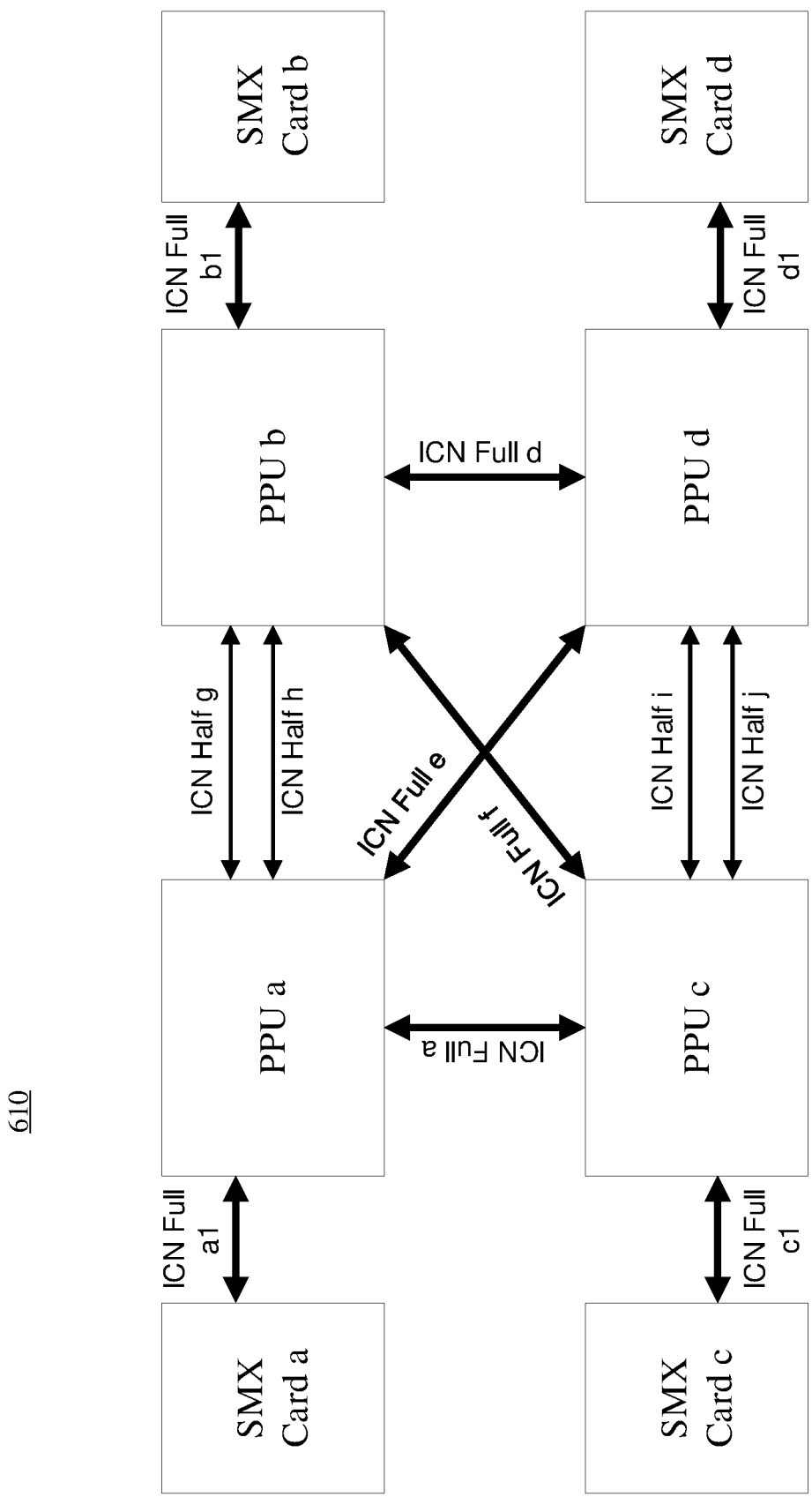
FIG. 6B is a schematic of another example system of connected PPU cards with smart memory extension cards, according to some embodiments of this specification.

FIG. 6B is a schematic of another example system of connected PPU cards with smart memory extension cards, according to some embodiments of this specification. The schematic in FIG. 6B is for illustrative purposes only, and the system 610 shown in FIG. 6B may have fewer, more, and alternative components and connections depending on the implementation.

As shown in FIG. 6B, the system 610 can comprise 4 PPUs, namely PPU a, PPU b, PPU c, and PPU d. In some embodiments, each of the PPUs a-d is similar to the PPU card 300 shown in FIG. 3. For example, each of the PPUs a-d can include 3 ICN full-speed links and 2 half-speed links. As shown in FIG. 6B, each of the PPUs a-d is connected to each of the other PPUs via an ICN full-speed link or 2 ICN half-speed links. For example, the PPU a is connected to the PPU b via 2 ICN half-speed links g and h, to the PPU c via an ICN full-speed link a, and to the PPU d via an ICN full-speed link e. In some embodiments, each of the PPUs a-d can be connected to an SMX card. For example, as shown in FIG. 6B, the PPU a is connected to an SMX card a via an ICN full-speed link a1, the PPU b is connected to an SMX card b via an ICN full-speed link b1, the PPU c is connected to an SMX card c via an ICN full-speed link c1, and the PPU d is connected to an SMX card d via an ICN full-speed link d1. In some embodiments, each of the SMX cards a-d shown in FIG. 6B is similar to the SMX card 500 of FIG. 5. As shown in FIG. 6B, there are 8 ICN full-speed links and 4 ICN half-speed links. Therefore, each of the PPUs in the system 610 can access resources (e.g., memory resources) of any of the other PPUs or SMX cards via at most 2 hops. For example, although there is no direct link connecting the PPU a and the SMX card d, the PPU a can access the memory resource in the SMX card d via 1 ICN full-speed link e and 1 ICN full-speed link d1. In some embodiments, each of the PPUs can comprise an ICN switch configured to facilitate data accessing of resources. For example, the PPU a can access the memory resource in the SMX card d via the 1 ICN full-speed link e and the 1 ICN full-speed links d1, using an ICN switch located in the PPU d. The ICN full-speed links and half-speed links shown in FIG. 6B can help each of the PPUs to access resources (e.g., memory resources) of other PPUs and SMX cards with efficiency. As a result, the memory capacity is no longer limited to a single PPU, and the data transmission between PPUs and the SMX cards can be improved.

Figure 6C:
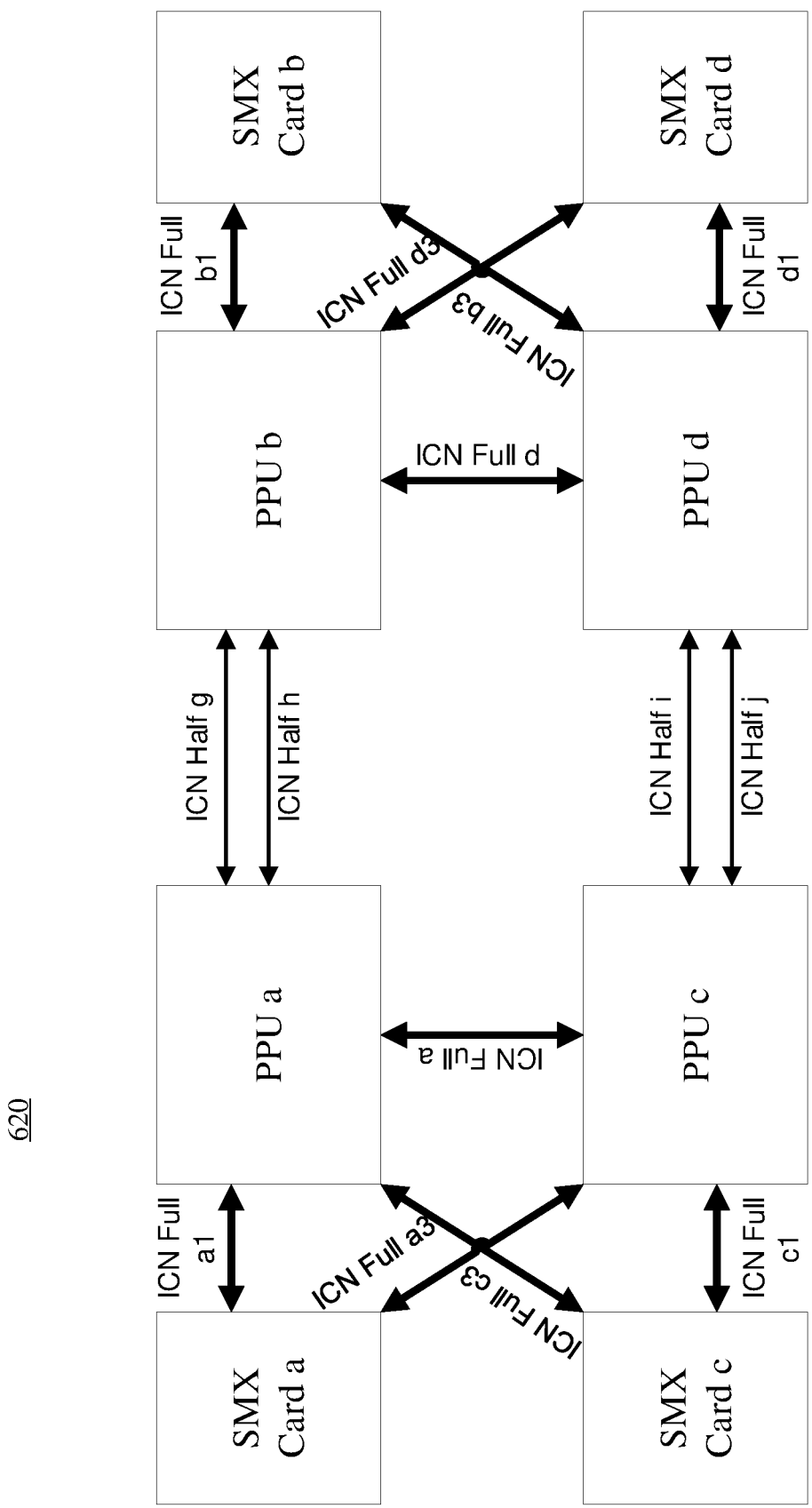
FIG. 6C is a schematic of another example system of connected PPU cards with smart memory extension cards, according to some embodiments of this specification.

FIG. 6C is a schematic of another example system of connected PPU cards with smart memory extension cards, according to some embodiments of this specification. The schematic in FIG. 6C is for illustrative purposes only, and the system 620 shown in FIG. 6C may have fewer, more, and alternative components and connections depending on the implementation.

As shown in FIG. 6C, the system 620 can comprise 4 PPUs, namely PPU a, PPU b, PPU c, and PPU d. In some embodiments, each of the PPUs a-d is similar to the PPU card 300 shown in FIG. 3. For example, each of the PPUs a-d can include 3 ICN full-speed links and 2 half-speed links. As shown in FIG. 6C, each of the PPUs a-d is connected to one or more of the other PPUs via an ICN full-speed link or 2 ICN half-speed links. For example, the PPU a is connected to the PPU b via 2 ICN half-speed links g and h, and to the PPU c via an ICN full-speed link a. In some embodiments, each of the PPUs a-d can be connected to an SMX card. For example, as shown in FIG. 6C, the PPU a is connected to an SMX card a via 1 ICN full-speed link a1, the PPU b is connected to an SMX card b via 1 ICN full-speed link b1, the PPU c is connected to an SMX card c via 1 ICN full-speed link c1, and the PPU d is connected to an SMX card d via 1 ICN full-speed link d1. In some embodiments, each of the PPUs can be connected to one additional SMX card. For example, as shown in FIG. 6C, the PPU a is connected to an SMX card c via 1 ICN full-speed link c1, the PPU b is connected to an SMX card d via 1 ICN full-speed link d3, the PPU c is connected to an SMX card a via 1 ICN full-speed link a3, and the PPU d is connected to an SMX card b via 1 ICN full-speed link b3. In some embodiments, each of the SMX cards a-d shown in FIG. 6C is similar to the SMX card 500 of FIG. 5. As shown in FIG. 6C, there are 10 ICN full-speed links and 4 ICN half-speed links. Therefore, each of the PPUs in the system 620 can access resources (e.g., memory resources) of any of the other PPUs or SMX cards via at most 2 hops. For example, although there is no direct link connecting the PPU a and the SMX card d, the PPU a can access the memory resource in the SMX card d via 2 ICN half-speed links g and h and 1 ICN full-speed link d3. In some embodiments, each of the PPUs can comprise an ICN switch configured to facilitate data accessing of resources. For example, the PPU a can access the memory resource in the SMX card d via the 2 ICN half-speed links g and h and the 1 ICN full-speed link d3, using an ICN switch located in the PPU b. The ICN full-speed links and half-speed links shown in FIG. 6C can help each of the PPUs to access resources (e.g., memory resources) of other PPUs and SMX cards with efficiency. As a result, the memory capacity is no longer limited to a single PPU, and the data transmission between PPUs and the SMX cards can be improved.

Figure 7:
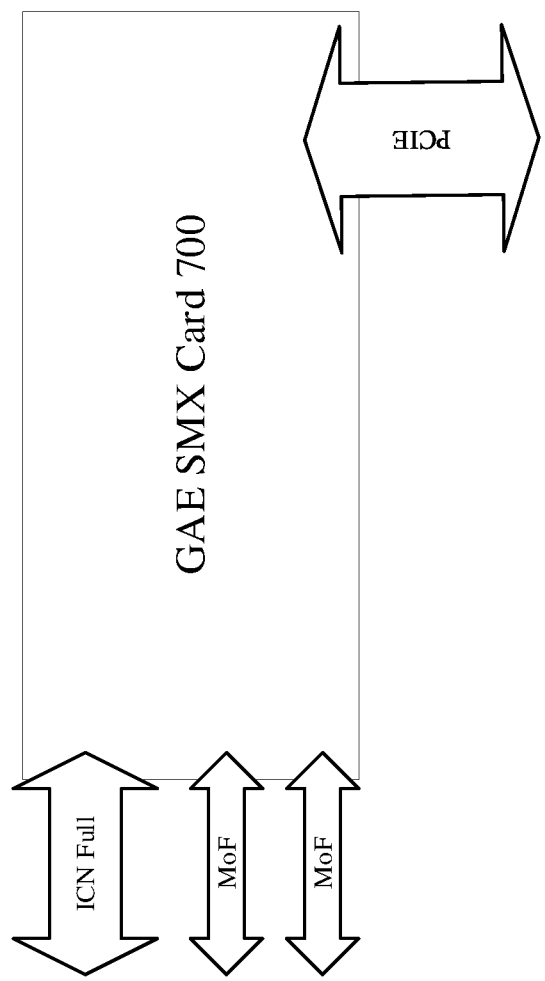
FIG. 7 is a schematic of an example graphic access engine-based smart memory extension card, according to some embodiments of this specification.

In some embodiments, the system further comprises one or more graphic access engine (GAE) based memory extension cards. FIG. 7 is a schematic of an example graphic access engine-based smart memory extension card, according to some embodiments of this specification. The schematic in FIG. 7 is for illustrative purposes only, and the GAE SMX card 700 shown in FIG. 7 may have fewer, more, and alternative components and connections depending on the implementation. In some embodiments, the GAE SMX card 700 can be implemented on an FPGA.

The GAE SMX card 700 shown in FIG. 7 can be configured to provide additional memory capacity for processors (e.g., the PPU card 300 shown in FIG. 3 and the PPUs shown in FIG. 4A, FIG. 4B, and FIG. 4C) and can be communicatively coupled with the processors. In some embodiments, the GAE SMX card 700 comprises one or more memories (e.g., the memory 2230 of FIG. 2A, the DDRs shown in FIG. 2B or FIG. 2C, or SSDs), and the memories can be configured to store graph data. As shown in FIG. 7, the GAE SMX card 700 can be configured to include a plurality of connections. For example, as shown in FIG. 7, the GAE SMX card 700 can include 1 ICN full-speed link and 2 memory-over-fabric (MoF) links or interconnects. In some embodiments, the ICN full-speed link can be bi-directional (e.g., 100 GB/s). In some embodiments, one form factor for the ICN full-speed links is a QSFP-DD port (e.g., 2 QSFP-DD ports per one ICN full-speed link). In some embodiments, the one or more MoF links can be bi-directional (e.g., 50 GB/s per link). In some embodiments, the MoF links can be FPGA-to-FPGA connections, such as an FPGA-to-FPGA connection IP developed for accelerating graph applications. In some embodiments, one form factor for the MoF links is a QSFP-DD port (e.g., 1 QSFP-DD port per one MoF link). The MoF links can be connected to GAEs and facilitate the connected GAEs to, for example, communicate with each other to perform near-memory processing on graph applications. In some embodiments, the GAE SMX card 700 also includes one or more converting breakout cables between the ICN bridge and the one or more QSFP-DD ports. In some embodiments, the GAE SMX card 700 is configured to include a PCIe connection.

In some embodiments, the GAE SMX card 700 includes one or more modules shown in FIG. 2A, FIG. 2B, and FIG. 2C. For example, the GAE SMX card 700 can include an access engine similar to the access engine 2310 of FIG. 2C or the access engine 2400 of FIG. 2D, a RISC-V similar to the RISC-V 2330 of FIG. 2B, and an execution engine similar to the GEMM execution engine 2340 of FIG. 2B, the VPU execution engine 2350 of FIG. 2B, or a combination of. As a result, the GAE SMX card 700 can be configured to perform operations that accelerate GNN memory access in a near-memory manner. Further, the operations performed by the GAE SMX card can facilitate the PPUs to perform GNN operations (e.g., similar to the GNN module 2220 of FIG. 2 facilitating the dedicated processor 2240).

Figure 8A:
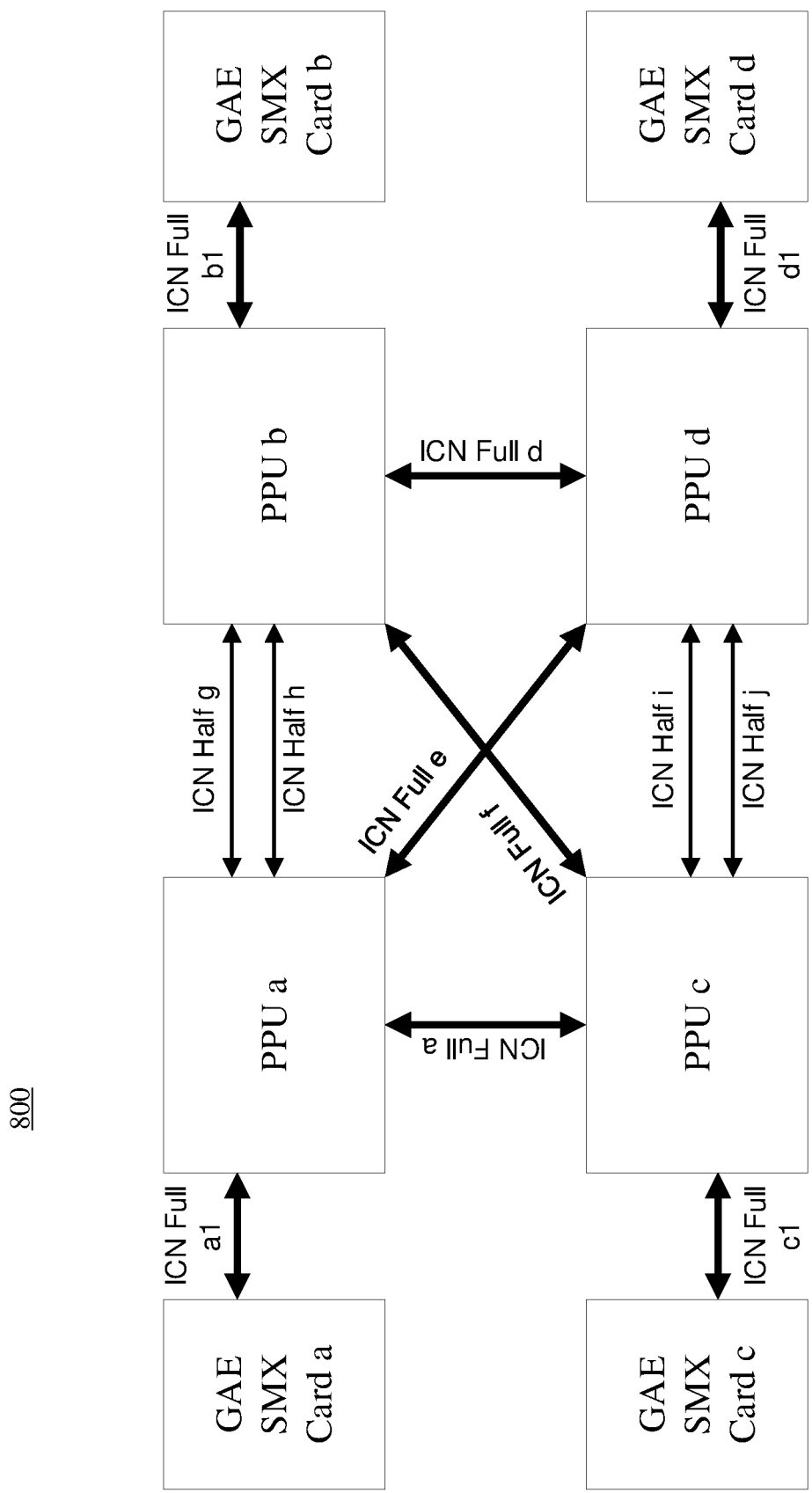
FIG. 8A is a schematic of an example system of connected PPU cards with graphic access engine-based smart memory extension cards, according to some embodiments of this specification.

FIG. 8A is a schematic of an example system of connected PPU cards with graphic access engine-based smart memory extension cards, according to some embodiments of this specification. The schematic in FIG. 8A is for illustrative purposes only, and the system 800 shown in FIG. 8A may have fewer, more, and alternative components and connections depending on the implementation.

As shown in FIG. 8A, the system 800 may comprise 4 PPUs, namely PPU a, PPU b, PPU c, and PPU d. In some embodiments, each of the PPUs a-d is similar to the PPU card 300 shown in FIG. 3. For example, each of the PPUs a-d can include 3 ICN full-speed links and 2 half-speed links. As shown in FIG. 8A, each of the PPUs a-d is connected to each of the other PPUs via an ICN full-speed link or 2 ICN half-speed links. For example, the PPU a is connected to the PPU b via 2 parallel ICN half-speed links g and h, to the PPU c via an ICN full-speed link a, and to the PPU d via an ICN full-speed link e. In some embodiments, each of the PPUs a-d can be connected to a GAE SMX card. For example, as shown in FIG. 8A, the PPU a is connected to a GAE SMX card a via an ICN full-speed link a1, the PPU b is connected to a GAE SMX card b via an ICN full-speed link b1, the PPU c is connected to a GAE SMX card c via an ICN full-speed link c1, and the PPU d is connected to a GAE SMX card d via an ICN full-speed link d1. In some embodiments, each of the GAE SMX cards a-d shown in FIG. 8A is similar to the GAE SMX card 700 of FIG. 7. As shown in FIG. 8A, there are 8 ICN full-speed links and 4 ICN half-speed links in the system 800 connecting the PPU cards and the GAE SMX cards. Therefore, each of the PPUs in the system 800 can access resources (e.g., memory resources) of any of the other PPUs or GAE SMX cards via at most 2 hops. For example, although there is no direct link connecting the PPU a and the GAE SMX card d, the PPU a can access the memory resource in the GAE SMX card d via 1 ICN full-speed link e and 1 ICN full-speed link d1. In some embodiments, each of the PPUs can comprise an ICN switch configured to facilitate data accessing of resources. For example, the PPU a can access the memory resource in the GAE SMX card d via the 1 ICN full-speed link e and the 1 ICN full-speed links d1, using an ICN switch located in the PPU d. The ICN full-speed links and half-speed links shown in FIG. 8A can help each of the PPUs to access resources (e.g., memory resources) of other PPUs and GAE SMX cards with efficiency. As a result, the memory capacity is no longer limited to a single PPU, and the data transmission between PPUs and the GAE SMX cards can be improved.

Figure 8B:
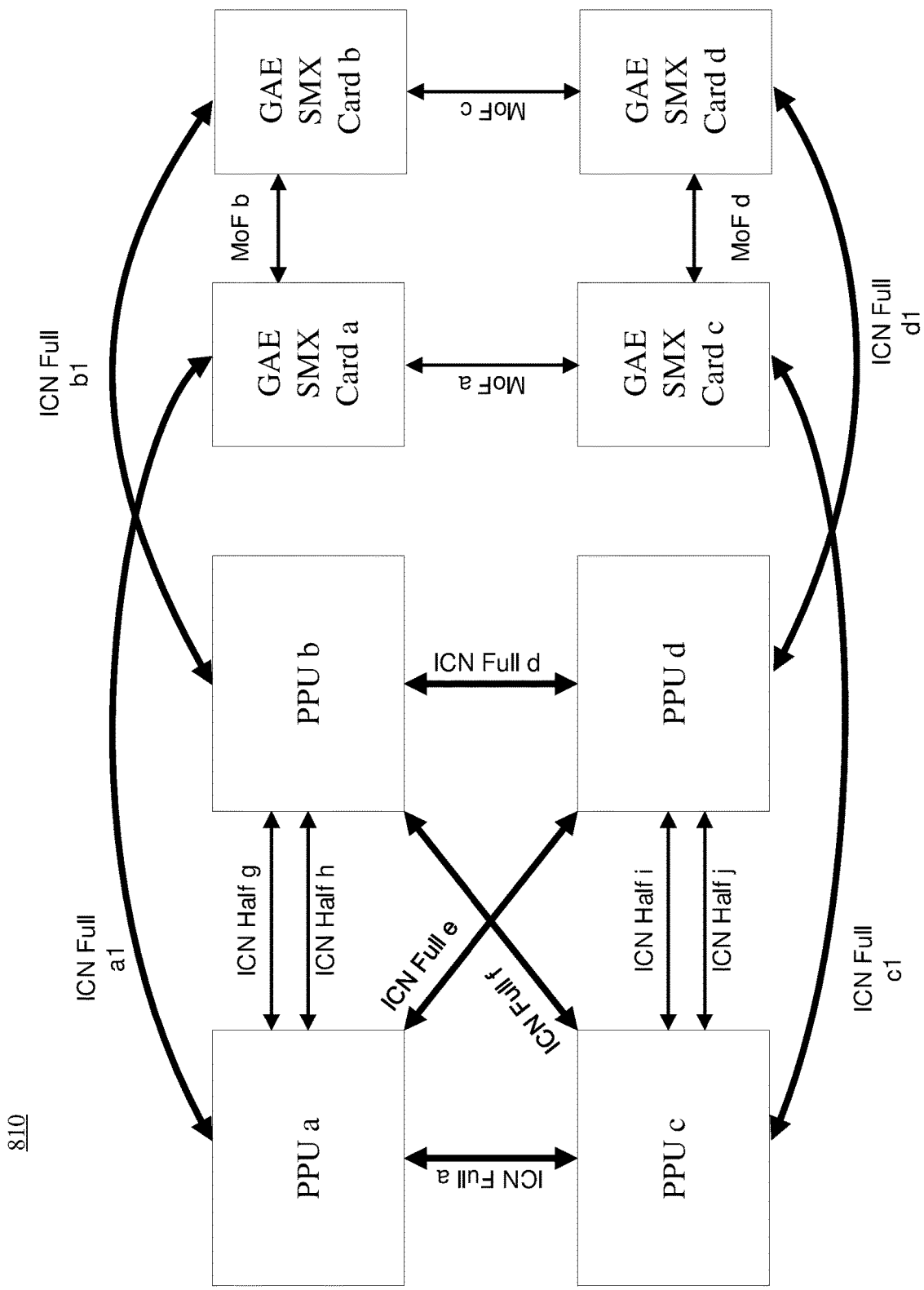
FIG. 8B is a schematic of another example system of connected PPU cards with graphic access engine-based smart memory extension cards, according to some embodiments of this specification.

FIG. 8B is a schematic of another example system of connected PPU cards with graphic access engine based smart memory extension cards, according to some embodiments of this specification. The schematic in FIG. 8B is for illustrative purposes only, and the system 810 shown in FIG. 8B may have fewer, more, and alternative components and connections depending on the implementation.

As shown in FIG. 8B, the system 810 can comprise 4 PPUs, namely PPU a, PPU b, PPU c, and PPU d. In some embodiments, each of the PPUs a-d is similar to the PPU card 300 shown in FIG. 3. For example, each of the PPUs a-d can include 3 ICN full-speed links and 2 half-speed links. As shown in FIG. 8B, each of the PPUs a-d is connected to each of the other PPUs via an ICN full-speed link or 2 ICN half-speed links. For example, the PPU a is connected to the PPU b via 2 ICN half-speed links g and h, to the PPU c via an ICN full-speed link a, and to the PPU d via an ICN full-speed link e. In some embodiments, each of the PPUs a-d can be connected to a GAE SMX card. For example, as shown in FIG. 8B, the PPU a is connected to a GAE SMX card a via an ICN full-speed link a1, the PPU b is connected to a GAE SMX card b via an ICN full-speed link b1, the PPU c is connected to a GAE SMX card c via an ICN full-speed link c1, and the PPU d is connected to a GAE SMX card d via an ICN full-speed link d1. In some embodiments, each of the GAE SMX cards can be connected to one or more of the other GAE SMX cards. For example, as shown in FIG. 8B, the GAE SMX card a is connected to the GAE SMX card b via an MoF link b and to the GAE SMX card c via an MoF link a. In some embodiments, each of the GAE SMX cards a-d shown in FIG. 8A is similar to the GAE SMX card 700 of FIG. 7. As shown in FIG. 8A, there are 8 ICN full-speed links, 4 ICN half-speed links, and 4 MoF links. Therefore, each of the PPUs in the system 800 can access resources (e.g., memory resources) of any of the other PPUs or GAE SMX cards via at most 2 hops. For example, although there is no direct link connecting the PPU a and the GAE SMX card d, the PPU a can access the memory resource in the GAE SMX card d via 1 ICN full-speed link e and 1 ICN full-speed link d1. In some embodiments, each of the PPUs can comprise an ICN switch configured to facilitate data accessing of resources. For example, the PPU a can access the memory resource in the GAE SMX card d via the 1 ICN full-speed link e and the 1 ICN full-speed links d1, using an ICN switch located in the PPU d. In addition, each of the GAE SMX cards can access resources (e.g., memory resources) of any of the other GAE SMX cards via at most 2 hops. For example, the GAE SMX card a can access memory resources of the GAE SMX card b via the MoF link b, and the GAE SMX card a can access memory resources of the GAE SMX card d via the MoF links b and c or via the MoF links a and d. In some embodiments, each of the GAE SMX cards can comprise an MoF switch configured to facilitate data accessing of resources. For example, the GAE SMX card a can access memory resources of the GAE SMX card d via the MoF link b and the MoF link c, using an MoF switch located in the GAE SMX card b. The ICN full-speed links and half-speed links and the MoF links shown in FIG. 8B can help each of the PPUs and the GAE SMX cards to access resources (e.g., memory resources) of other PPUs and GAE SMX cards with efficiency. As a result, the memory capacity is no longer limited to a single PPU or a single GAE SMX card, and the data transmission among the PPUs and the GAE SMX cards can be improved. In some embodiments, the system 810 shown in FIG. 8B can help facilitate data accessing for graph data with near-memory processing.

It may be noted that the system 800 in FIG. 8A is different from the system 810 in FIG. 8B. For example, for a PPU accessing a GAE SMX card not directly connected to the PPU, the system 800 can provide a different route than the system 810. In the system 800, for example, the PPU a can access the GAE SMX card d via another PPU (e.g., the PPU d). In the system 810, the PPU a can access the GAE SMX card d via another GAE SMX card (e.g., the GAE SMX card a).

Figure 9:
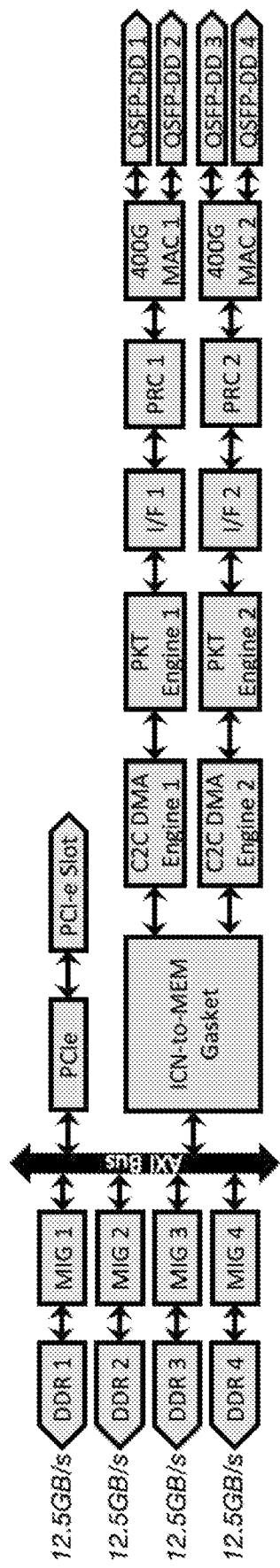
FIG. 9 is a schematic of an example memory accessing system of a memory extension card, according to some embodiments of this specification.

In some embodiments, each of the SMX cards (e.g., SMX cards shown in FIG. 5 and FIGS. 6A-C) can include one or more memory controlling modules to facilitate the memory accessing. FIG. 9 is a schematic of an example memory accessing system of a memory extension card, according to some embodiments of this specification. The schematic in FIG. 9 is for illustrative purposes only, and the memory accessing system 900 shown in FIG. 9 may have fewer, more, and alternative components and connections depending on the implementation. It is appreciated that the memory accessing system 900 shown in FIG. 9 can be implemented in the SMX cards shown in FIG. 5 and FIGS. 6A-C. In some embodiments, the memory accessing system 900 can be implemented on an FPGA.

In some embodiments, the memory accessing system 900 comprises a plurality of random access memories (RAM). For example, as shown in FIG. 9, the memory accessing system 900 includes four DDRs (e.g., DDRs where each has a bandwidth of 12.5 GB/s). In some embodiments, each of the DDRs can be connected with a memory interface. For example, as shown in FIG. 9, each of the DDRs is connected with a memory interface generator (MIG) configured to generate, on an FPGA, memory interfaces for the DDRs. In some embodiments, the DDRs are connected to an AXI bus.

In some embodiments, the memory accessing system 900 shown in FIG. 9 comprises an ICN-to-mem gasket module configured to perform translations of data between local memory operations (e.g., memory operations on the DDRs) and data packets transferred through one or more ICN links. The ICN-to-mem gasket module can be configured to be connected with the AXI bus, and access the DDRs via the AXI bus. In some embodiments, the memory accessing system 900 comprises 2 ICN full-speed links. For example, similar to the SMX cards shown in FIG. 5 and FIGS. 6A-C, each SMX card that comprises the memory accessing system 900 can comprise 2 ICN full-speed links in the form of 2 QSFP-DD ports per one ICN full-speed link (e.g., as shown in FIG. 9). In some embodiments, the memory accessing system 900 comprises a plurality of modules connecting the ICN-to-mem gasket module and the QSFP-DD ports, such as one or more C2C DMA engine modules, one or more PKT engine modules, one or more I/F modules, one or more PRC modules, and one or more MAC modules.

In some embodiments, the memory accessing system 900 of FIG. 9 comprises a PCIe connection, similar to the SMX cards shown in FIG. 5 and FIGS. 6A-C. In some embodiments, as shown in FIG. 9, the PCIe connection and PCIe slot is connected to the AXI bus and can access the DDRs via the AXI bus.

Figure 10:
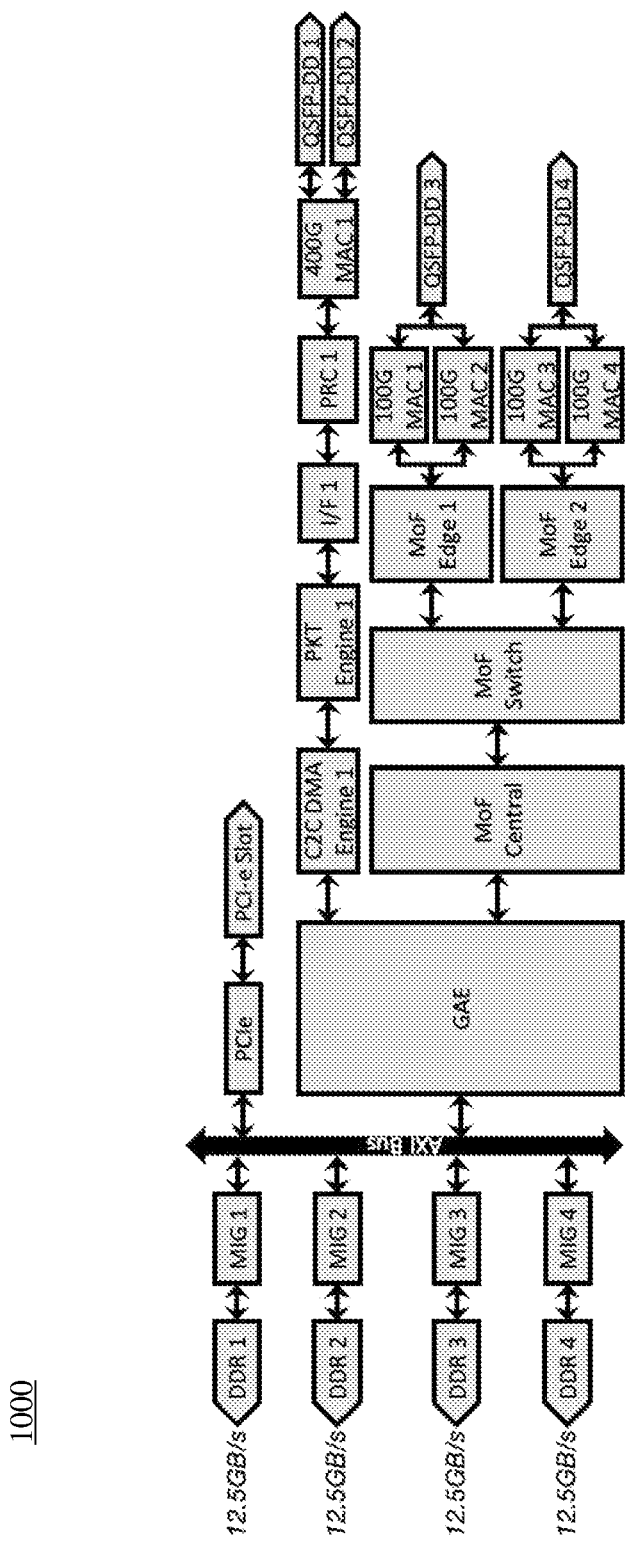
FIG. 10 is a schematic of an example memory accessing system of a graphic access engine-based memory extension card, according to some embodiments of this specification.

In some embodiments, each of the GAE SMX cards (e.g., GAE SMX cards shown in FIG. 7 and FIGS. 8A-B) can include one or more memory controlling modules to facilitate the memory accessing. FIG. 10 is a schematic of an example memory accessing system of a graphic access engine based memory extension cards, according to some embodiments of this specification. The schematic in FIG. 10 is for illustrative purposes only, and the memory accessing system 1000 shown in FIG. 10 may have fewer, more, and alternative components and connections depending on the implementation. It is appreciated that the memory accessing system 1000 shown in FIG. 10 can be implemented in the SMX cards shown in FIG. 7 and FIGS. 8A-B. In some embodiments, the memory accessing system 1000 can be implemented on an FPGA.

In some embodiments, the memory accessing system 1000 comprises a plurality of random access memories (RAM). For example, as shown in FIG. 10, the memory accessing system 1000 includes four DDRs (e.g., DDRs where each has a bandwidth of 12.5 GB/s). In some embodiments, each of the DDRs can be connected with a memory interface. For example, as shown in FIG. 10, each of the DDRs is connected with memory interface generator (MIG) configured to generate, on an FPGA, memory interfaces for the DDRs. In some embodiments, the DDRs are connected to an AXI bus.

In some embodiments, the memory accessing system 1000 shown in FIG. 10 comprises a GAE module that is connected to the AXI buss and can access the DDRs via the AXI bus. In some embodiments, the GAE module comprises a graph accelerator module configured to perform near-memory processing for graph applications. In some embodiments, the GAE module comprises an ICN-to-mem gasket module configured to perform translations of data between local memory operations (e.g., memory operations on the DDRs) and data packets transferred through one or more ICN links. In some embodiments, the memory accessing system 1000 comprises 1 ICN full-speed link. For example, similar to the GAE SMX cards shown in FIG. 7 and FIGS. 8A-B, each GAE SMX card that comprises the memory accessing system 1000 can comprise 1 ICN full-speed link in the form of 2 QSFP-DD ports per 1 ICN full-speed link (e.g., as shown in FIG. 10). In some embodiments, the memory accessing system 1000 comprises a plurality of modules connecting the ICN-to-mem gasket module in the GAE module and the QSFP-DD ports, such as one or more C2C DMA engine modules, one or more PKT engine modules, one or more I/F modules, one or more PRC modules, and one or more MAC modules.

In some embodiments, the memory accessing system 1000 comprises 2 MoF links. For example, similar to the GAE SMX cards shown in FIG. 7 and FIGS. 8A-B, each GAE SMX card that comprises the memory accessing system 1000 can comprise 2 MoF link in the form of 1 QSFP-DD ports per 1 MoF link (e.g., as shown in FIG. 10). In some embodiments, the memory accessing system 1000 comprises a plurality of modules connecting the GAE module and the QSFP-DD ports of the MoF links, such as one or more MoF central modules, one or more MoF switch modules, one or more MoF edge modules, and one or more MAC modules.

In some embodiments, the memory accessing system 1000 of FIG. 10 comprises a PCIe connection, similar to the GAE SMX cards shown in FIG. 7 and FIGS. 8A-B. In some embodiments, as shown in FIG. 10, the PCIe connection and PCIe slot is connected to the AXI bus and can access the DDRs via the AXI bus.

Figure 11:
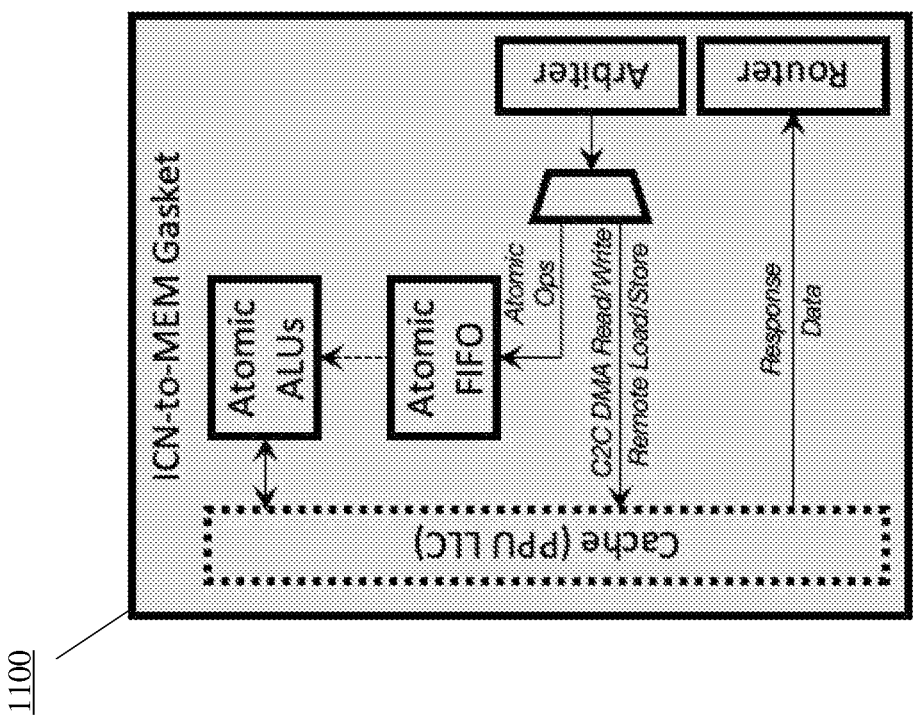
FIG. 11 is a schematic of an example ICN-to-mem gasket module of a memory accessing system, according to some embodiments of this specification.

FIG. 11 is a schematic of an example ICN-to-mem gasket module of a memory accessing system, according to some embodiments of this specification. The schematic in FIG. 11 is for illustrative purposes only, and the ICN-to-mem gasket module 1100 shown in FIG. 11 may have fewer, more, and alternative components and connections depending on the implementation. It is appreciated that the ICN-to-mem gasket module 1100 shown in FIG. 11 can be similar to the ICN-to-mem gasket modules of FIG. 9 or FIG. 10. In some embodiments, the ICN-to-mem gasket module 1100 can be implemented on an FPGA.

In some embodiments, the ICN-to-mem gasket module 1100 shown in FIG. 11 can include an arbiter, a router, and modules such as an atomic ALU module and an atomic FIFO module to perform memory-based operations (e.g., atomic operations). For example, the arbiter can be configured to arbitrate ingress ICN packets to atomic modules according to an ICN command type, the router can be configured to route responses and data to different ICN links according to a physical address (e.g., an encoded physical address). In some embodiments, the ICN-to-mem gasket module 1100 comprises a cache. In some embodiments, the atomic FIFO module is configured to manage operating sequences of atomic operations. In some embodiments, the atomic ALU module is in charge of processing computations involved in the atomic operations.

Figure 12:
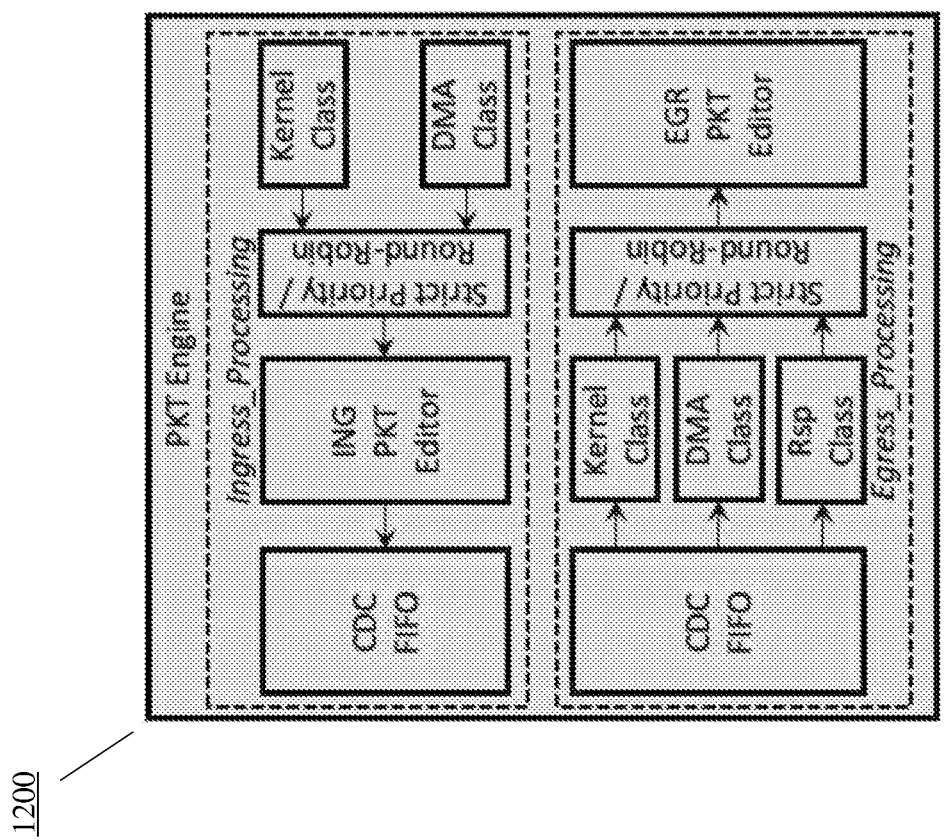
FIG. 12 is a schematic of an example packet (PKT) engine module of a memory accessing system, according to some embodiments of this specification.

FIG. 12 is a schematic of an example packet (PKT) engine module of a memory accessing system, according to some embodiments of this specification. The schematic in FIG. 12 is for illustrative purposes only, and the PKT engine module 1200 shown in FIG. 12 may have fewer, more, and alternative components and connections depending on the implementation. It is appreciated that the PKT engine module 1200 shown in FIG. 12 can be similar to the PKT engine modules of FIG. 9 or FIG. 10. In some embodiments, the PKT engine module 1200 can be implemented on an FPGA.

In some embodiments, the PKT engine module 1200 of FIG. 12 is configured to handle packet editing and CDC (clock domain crossing) designs. In some embodiments, as shown in FIG. 12, the PKT engine module 12 can include two functional domains: an ingress processing domain and an egress processing domain. In some embodiments, different classes of input streams (e.g., kernel class, DMA class, etc.) can be arbitrated (e.g., via an arbitration module based on either a strict priority arbitration rule or a round-robin arbitration rule). The winner from the arbitration can be transmitted to an ING PKT editor module. In some embodiments, the PKT engine module 1200 includes one or more CDC FIFO modules (e.g., asynchronous FIFO) configured to perform CDC data transmissions. In some embodiments, the designs of the egress processing domain is a mirrored/reversed version of the ingress processing domain, and one difference is that a third stream class (e.g., response class) is appended.

Figure 13:
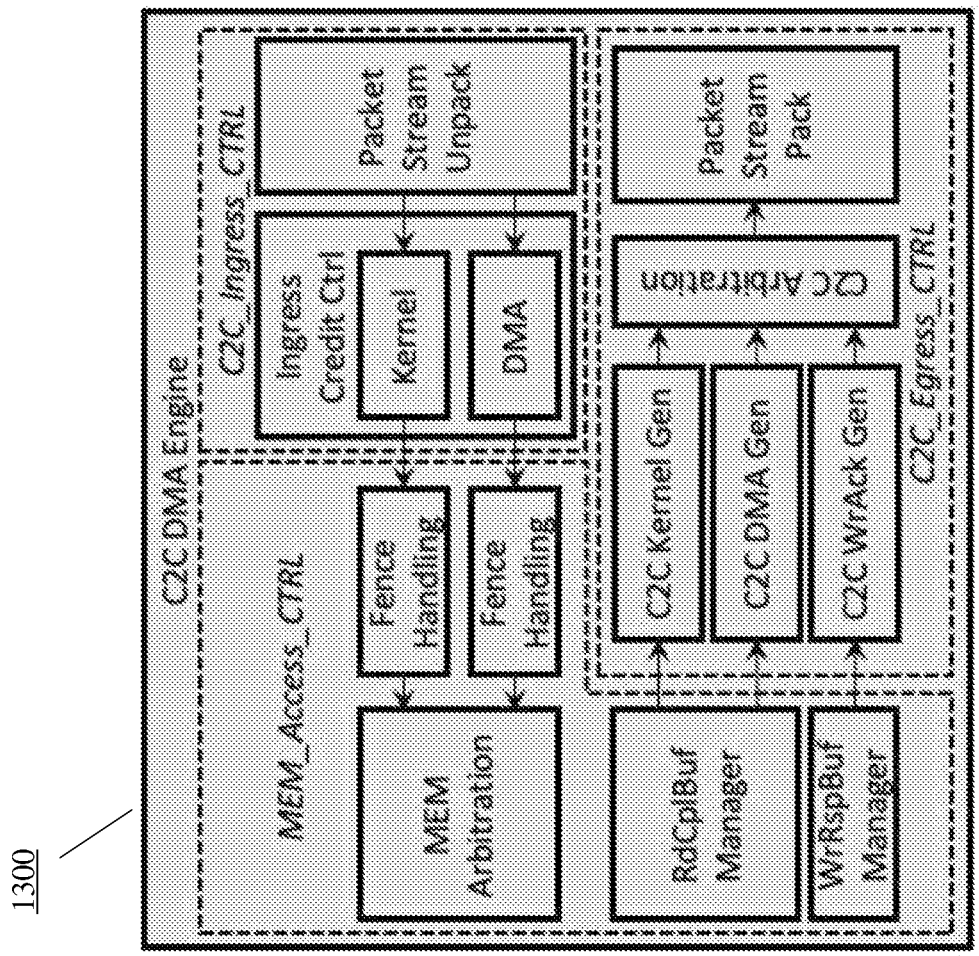
FIG. 13 is a schematic of an example chip-to-chip direct memory access engine module of a memory accessing system, according to some embodiments of this specification.

FIG. 13 is a schematic of an example chip-to-chip direct memory access engine module of a memory accessing system, according to some embodiments of this specification. The schematic in FIG. 13 is for illustrative purposes only, and the chip-to-chip (C2C) direct memory access (DMA) engine module 1300 shown in FIG. 13 may have fewer, more, and alternative components and connections depending on the implementation. It is appreciated that the C2C DMA engine module 1300 shown in FIG. 13 can be similar to the C2C DMA engine modules of FIG. 9 or FIG. 10. In some embodiments, the C2C DMA engine module can be implemented on an FPGA.

In some embodiments, the C2C DMA engine module 1300 is configured to manage the chip-to-chip connections via one or more ICN links. In some embodiments, as shown in FIG. 13, C2C DMA engine module 1300 can include three functional domains: a memory access control domain (MEM_Access_CTRL), a chip-to-chip ingress control domain (C2C_Ingress_CTRL), and a chip-to-chip egress control domain (C2C_Egress_CTRL).

In some embodiments, in the memory access control domain, two fence handling modules are included and configured to perform Fence operations in a plurality of ICN command classes in parallel. In some embodiments, a memory arbitration module is included and configured to perform arbitrations between two or more ICN command classes and send proper ICN commands and data to an ICN-to-mem gasket module (e.g., ICN-to-mem gasket module 1100 of FIG. 11). In some embodiments, a read completion buffer manager module (RdCplBuf_Manager) and a write completion buffer manager module (WrRspBuf_Manager) can be included and configured to manage the responses to read commands (Read Completion) and write commands (Write Response), respectively.

In some embodiments, in the chip-to-chip ingress control domain, a packet stream unpack module (Packet_Stream_Unpack) can be included and configured to unpack the ICN data stream into commands and data according to, for example, the customized ICN protocols. In some embodiments, depending on the operation class (e.g., kernel, DMA), the unpacked commands and data can be sent into a kernel credit control module (Kernel_Credit_Ctrl) or a DMA credt control module (DMA_Credit_Ctrl).

In some embodiments, in the chip-to-chip egress control domain, a chip-to-chip kernel generation module (C2C_Kernel_Gen) can be included and configured to generate kernel class responses, a chip-to-chip DMA generation module (C2C_DMA_Gen) can be included and configured to generate DMA class responses, and a chip-to-chip write acknowledgement generation module (C2C_WrAck_Gen) can be included and configured to generate write acknowledgement responses to processors (e.g., PPUs shown in FIGS. 3-8B). In some embodiments, the generated responses can be fed into a chip-to-chip arbitration module (C2C_Arbitration), which can be included and configured to perform arbitrations, such as round-robin based or strict priority based arbitrations. In some embodiments, the winner of the arbitration can be sent into the packet stream pack module (Packet_Stream_Pack), which can be included and configured to pack the commands and data according to, for example, the customized ICN protocols.

Figure 14:
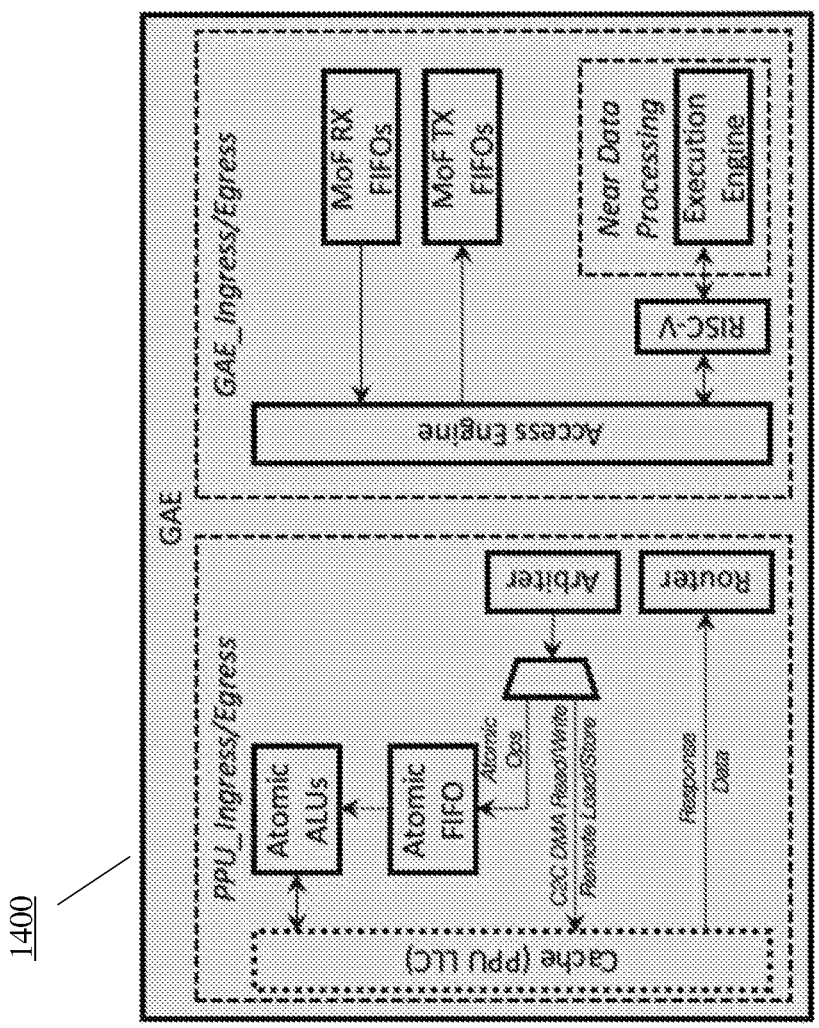
FIG. 14 is a schematic of an example graphic access engine module of a memory accessing system, according to some embodiments of this specification.

FIG. 14 is a schematic of an example graphic access engine module of a memory accessing system, according to some embodiments of this specification. The schematic in FIG. 14 is for illustrative purposes only, and the graphic access engine module 1400 shown in FIG. 14 may have fewer, more, and alternative components and connections depending on the implementation. It is appreciated that the graphic access engine module 1400 shown in FIG. 14 can be similar to the graphic access engine modules of FIG. 10. In some embodiments, the graphic access engine module can be implemented on an FPGA.

In some embodiments, the graphic access engine module is configured to extend an ICN-to-mem gasket module (e.g., ICN-to-mem gasket module 1100 of FIG. 11) to support near-memory processing for graph applications. In some embodiments, graphic access engine module can include two domains: a PPU ingress/egress domain (PPU_Ingress/Egress) and a graphic access engine ingress/egress domain (GAE_Ingress/Egress).

In some embodiments, as shown in FIG. 14, the PPU ingress/egress domain can be similar to the ICN-to-mem gasket module 1100 of FIG. 11. In some embodiments, the graphic access engine domain can include one or more modules similar to those shown in FIG. 2A, FIG. 2B, or FIG. 2C. For example, the graphic access engine domain can include an access engine (e.g., similar to the access engine 2310 of FIG. 2C or the access engine 2400 of FIG. 2D), MoF FIFOs, RISC-V (e.g., similar to RISC-V 2330 of FIG. 2B), and an execution engine (e.g., similar to GEMM execution engine 2340 of FIG. 2B, VPU execution engine 2350 of FIG. 2B, or a combination of). As a result, the graph access engine 1400 can enable the GAE SMX card to facilitate the PPUs to perform GNN operations (e.g., similar to the GNN module 2220 of FIG. 2 facilitating the dedicated processor 2240).

Figure 15:
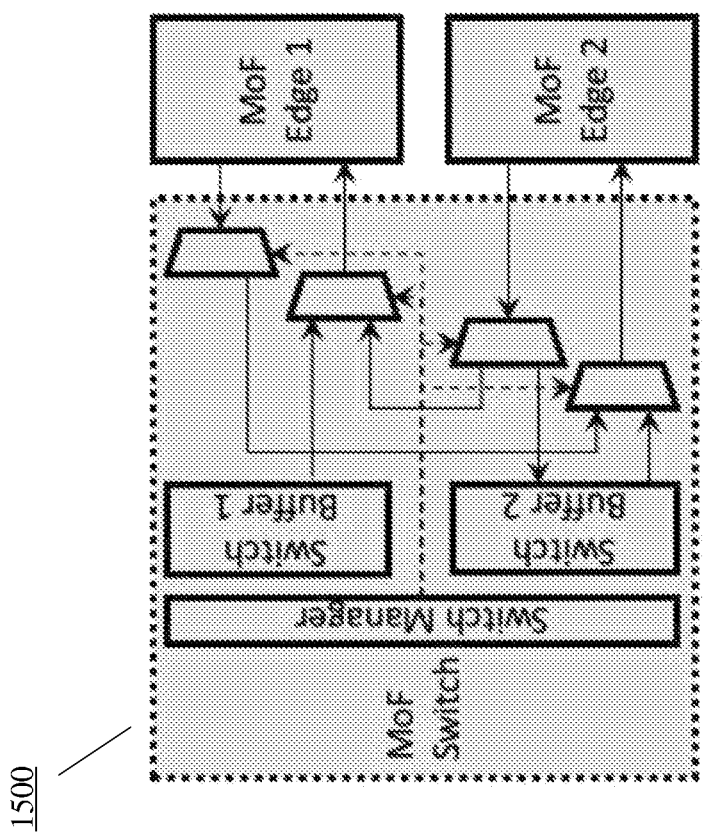
FIG. 15 is a schematic of an example memory of fabric switch module of a memory accessing system, according to some embodiments of this specification.

FIG. 15 is a schematic of an example memory of fabric switch module of a memory accessing system, according to some embodiments of this specification. The schematic in FIG. 15 is for illustrative purposes only, and the MoF switch module 1500 shown in FIG. 15 may have fewer, more, and alternative components and connections depending on the implementation. It is appreciated that the MoF switch module shown in FIG. 15 can be similar to the MoF switch of FIG. 10. In some embodiments, the MoF switch can be implemented on an FPGA.

In some embodiments, there can be 4 GAE SMX cards connected in a ring topology (e.g., the 4 GAE SMX cards connected by 4 MoF links as shown in FIG. 8B). As a result, each of the GAE SMX cards can be configured to support 1-hop data transmission so that all the SMX cards are fully connected with each other. As a result, the MoF switch module 1500 can be configured to perform a 1-hop data bypassing. For example, as shown in FIG. 10, the MoF switch module is located, in terms of data flow, between the MoF central module and the MoF edge module. In some embodiments, two switch buffers can be included and configured to store data packets for a current transaction. According to information encoded in data packets (e.g., card ID), a switch manager module can be included and configured to generate control signals to decide whether the incoming data packet is received or bypassed to other SMX cards.

FIG. 16 is an example method for accelerating GNN processing with one or more memory extension cards, according to some embodiments of this specification. The method 1600 may be implemented in an environment shown in FIG. 8A or FIG. 8B. The method 1600 may be performed by a device, apparatus, or system illustrated by FIGS. 8A-15. Depending on the implementation, the method 1600 may include additional, fewer, or alternative steps performed in various orders or parallel.

Step 1610 includes fetching, by a memory extension card, a portion of structure data of a graph from one or more memories in the memory extension card. In some embodiments, the fetching is performed by an access engine circuitry of the memory extension card (e.g., access engine shown in FIG. 14). In some embodiments, the memory extension card is communicatively coupled with a processing unit for graph neural network (GNN) processing via an interconnect of a first type (e.g., ICN full-speed link shown in FIG. 8A or FIG. 8B). In some embodiments, the memory extension card is communicatively coupled with each of two other memory extension cards via an interconnect of a second type (e.g., MoF links shown in FIG. 8B), and the method further includes fetching the portion of structure data from one or both of the two other memory extension cards. In some embodiments, the memory extension card is implemented on an FPGA.

Step 1620 includes performing node sampling using the fetched portion of the structure data of the graph to select one or more sampled nodes. In some embodiments, the node sampling is performed by the access engine circuitry. In some embodiments, the node sampling is performed in a similar manner as the GetNeighbor module 2410 of FIG. 2C or GetSample module 2420 of FIG. 2C.

Step 1630 includes fetching a portion of attribute data of the graph from the one or more memories according to the selected one or more sampled nodes. In some embodiments, the portion of the attribute data of the graph is fetched by the access engine circuitry. In some embodiments, the method further comprises fetching the portion of attribute data from one or both of the two other memories.

Step 1640 includes sending the fetched portion of the attribute data of the graph to the processing unit through the interconnect of the first type. In some embodiments, the fetched portion of the attribute data of the graph is sent by the access engine circuitry.

Step 1650 includes performing GNN processing for the graph using the fetched portion of the attribute data. In some embodiments, the GNN processing is performed by the processing unit. In some embodiments, the host comprises one or more processors configured to perform the GNN processing. In some embodiments, the one or more processors include one or more CPUs, GPUs, NPUs, dedicated graph neural network processing units, etc.

In some embodiments, the processing unit is communicatively coupled with three other processing units via either an interconnect of the first type or two interconnects of a third type. In some embodiments, a form factor for each of the interconnects of the first type is two QSFP-DD ports, the two QSFP-DD ports having a bandwidth equal to or larger than 100 GB/s. In some embodiments, a form factor for each of the interconnects of the second type is one QSFP-DD port, the one QSFP-DD port having a bandwidth equal to or larger than 50 GB/s. In some embodiments, a form factor for each of the interconnects of the third type is four Mini-SAS ports, the four Mini-SAS ports having a bandwidth equal to or larger than 50 GB/s. In some embodiments, the method further comprises performing, by a switch in the memory extension card, data bypassing for data received from each of the two other memory extension cards via an interconnect of the second type (e.g., similar to the GAE SMX cards shown in FIG. 8B). In some embodiments, the method further comprises performing, by a switch in the processing unit, data bypassing for data received from the three other processing units via either the interconnect of the first type or two interconnects of the third type (e.g., similar to the PPUs shown in FIG. 8A).

Each process, method, and algorithm described in the preceding sections may be embodied in, and fully or partially automated by, code modules executed by one or more computer systems or computer processors comprising computer hardware. The processes and algorithms may be implemented partially or wholly in application-specific circuit.

When the functions disclosed herein are implemented in the form of software functional units and sold or used as independent products, they can be stored in a processor executable non-volatile computer-readable storage medium. Particular technical solutions disclosed herein (in whole or in part) or aspects that contribute to current technologies may be embodied in the form of a software product. The software product may be stored in a storage medium, comprising a number of instructions to cause a computing device (which may be a personal computer, a server, a network device, and the like) to execute all or some steps of the methods of the embodiments of the present application. The storage medium may comprise a flash drive, a portable hard drive, ROM, RAM, a magnetic disk, an optical disc, another medium operable to store program code, or any combination thereof.

Particular embodiments further provide a system comprising a processor and a non-transitory computer-readable storage medium storing instructions executable by the processor to cause the system to perform operations corresponding to steps in any method of the embodiments disclosed above. Particular embodiments further provide a non-transitory computer-readable storage medium configured with instructions executable by one or more processors to cause the one or more processors to perform operations corresponding to steps in any method of the embodiments disclosed above.

Embodiments disclosed herein may be implemented through a cloud platform, a server or a server group (hereinafter collectively the "service system") that interacts with a client. The client may be a terminal device, or a client registered by a user at a platform, where the terminal device may be a mobile terminal, a personal computer (PC), and any device that may be installed with a platform application program.

The various features and processes described above may be used independently of one another or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The exemplary systems and components described herein may be configured differently than described. For example, elements may be added to, removed from, or rearranged compared to the disclosed example embodiments.

The various operations of example methods described herein may be performed, at least partially, by an algorithm. The algorithm may be comprised in program codes or instructions stored in a memory (e.g., a non-transitory computer-readable storage medium described above). Such algorithm may comprise a machine learning algorithm. In some embodiments, a machine learning algorithm may not explicitly program computers to perform a function but can learn from training data to make a prediction model that performs the function.

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Any process descriptions, elements, or blocks in the flow diagrams described herein and/or depicted in the attached figures should be understood as potentially representing modules, segments, or sections of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

As used herein, "or" is inclusive and not exclusive, unless expressly indicated otherwise or indicated otherwise by context. Therefore, herein, "A, B, or C" means "A, B, A and B, A and C, B and C, or A, B, and C," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The term "include" or "comprise" is used to indicate the existence of the subsequently declared features, but it does not exclude the addition of other features. Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

What is claimed is:

1. A system, comprising:
a plurality of processing units, each configured to perform graph neural network (GNN) processing; and
a plurality of memory extension cards, each configured to store graph data for the GNN processing, wherein:
each of the plurality of processing units is communicatively coupled with three other processing units via one or more interconnects respectively;
the plurality of processing units are communicatively coupled with the plurality of memory extension cards respectively; and
each of the plurality of memory extension cards includes a graphic access engine circuitry configured to accelerate GNN memory access, wherein the graphic access engine circuitry is further configured to:
fetch a portion of structure data of the graph data from one or more of the memory extensio cards;
perform node sampling using the fetched portion of the structure data to select one or more sampled nodes;
fetch a portion of attribute data of the graph data from one or more of the memory extension cards according to the selected one or more sampled nodes; and
send the fetched portion of the attribute data of the graph to one or more of the processing units.

2. The system of claim 1, wherein: the plurality of processing units include a first processing unit, a second processing unit, a third processing unit, and a fourth processing unit; the plurality of memory extension cards include a first memory extension card, a second memory extension card, a third memory extension card, and a fourth memory extension card; each of the first processing unit, the second processing unit, the third processing unit, and the fourth processing unit are communicatively coupled with each of the first memory extension card, the second memory extension card, the third memory extension card, and the fourth memory extension card respectively via an interconnect of a first type; the first processing unit is communicatively coupled with each of the third processing unit and the fourth processing unit via an interconnect of the first type; the second processing unit is communicatively coupled with each of the third processing unit and the fourth processing unit via an interconnect of the first type; the first processing unit is communicatively coupled with the second processing unit via two interconnects of a second type; the third processing unit is communicatively coupled with the fourth processing unit via two interconnects of the second type; the first memory extension card is communicatively coupled with each of the second memory extension card and the third memory extension card via an interconnect of a third type; and the fourth memory extension card is communicatively coupled with each of the second memory extension card and the third memory extension card via an interconnect of the third type.

3. The system of claim 2, wherein a bandwidth of each of the interconnects of the second type is half of a bandwidth of each of the interconnects of the first type.

4. The system of claim 2, wherein a form factor for each of the interconnects of the first type is two QSFP-DD ports, the two QSFP-DD ports having a bandwidth equal to or larger than 100 GB/s.

5. The system of claim 2, wherein:
a form factor for each of the interconnects of the second type is four Mini-SAS ports, the four Mini-SAS ports having a bandwidth equal to or larger than 50 GB/s;
the first processing unit is communicatively coupled with the second processing unit via two parallel interconnects of the second type; and
the third processing unit is communicatively coupled with the fourth processing unit via two parallel interconnects of the second type.

6. The system of claim 2, wherein a form factor for each of the interconnects of the third type is one QSFP-DD port, the one QSFP-DD port having a bandwidth equal to or larger than 50 GB/s.

7. The system of claim 2, wherein each of the memory extension cards is further configured to perform translations of data between local memory operations and data packets transferred through one or more interconnects of the first type or the second type.

8. The system of claim 2, wherein each of the memory extension cards includes a switch configured to perform data bypassing for data received from one or more of the memory extension cards via one or more of the interconnects of the third type.

9. The system of claim 1, wherein:
the plurality of processing units include a first processing unit, a second processing unit, a third processing unit, and a fourth processing unit;
the plurality of memory extension cards include a first memory extension card, a second memory extension card, a third memory extension card, and a fourth memory extension card;
each of the first processing unit, the second processing unit, the third processing unit, and the fourth processing unit are communicatively coupled with each of the first memory extension card, the second memory extension card, the third memory extension card, and the fourth memory extension card respectively via an interconnect of a first type;
the first processing unit is communicatively coupled with each of the third processing unit and the fourth processing unit via an interconnect of the first type;
the second processing unit is communicatively coupled with each of the third processing unit and the fourth processing unit via an interconnect of the first type;
the first processing unit is communicatively coupled with the second processing unit via two interconnects of a second type; and
the third processing unit is communicatively coupled with the fourth processing unit via two interconnects of the second type.

10. The system of claim 9, wherein:
a form factor for each of the interconnects of the first type is two QSFP-DD ports, the two QSFP-DD ports having a bandwidth equal to or larger than 100 GB/s;
a form factor for each of the interconnects of the second type is four Mini-SAS ports, the four Mini-SAS ports having a bandwidth equal to or larger than 50 GB/s;
the first processing unit is communicatively coupled with the second processing unit via two parallel interconnects of the second type; and
the third processing unit is communicatively coupled with the fourth processing unit via two parallel interconnects of the second type.

11. The system of claim 9, wherein each of the first, second, third, and fourth processing units includes a switch configured to perform data bypassing for data received from one or more of the other processing units via one or more of the interconnects of the first type or the second type.

12. The system of claim 1, wherein each of the memory extension cards is implemented on a field programmable gate array (FPGA).

13. The system of claim 1, wherein each of the processing units include one or more central processing units (CPUs), one or more graphics processing units (GPUs), one or more tensor processing units (TPU), one or more neural processing units (NPUs), or one or more graph neural network processing units.

14. A memory extension card, comprising: one or more memories configured to store graph data for graph neural network (GNN) processing; one interconnect of a first type configured to connect the memory extension card with a processing unit configured to perform the GNN processing; two interconnects of a second type configured to connect the memory extension card with two other memory extension cards; and a graphic access engine circuitry configured to: fetch a portion of structure data of the graph from the one or more memories or the two other memory extension cards; perform node sampling using the fetched portion of the structure data to select one or more sampled nodes; fetch a portion of attribute data of the graph from the one or more memories or the two other memory extension cards according to the selected one or more sampled nodes; and send the fetched portion of the attribute data of the graph to the processing unit via the one interconnect of the first type, wherein a bandwidth of each of the two interconnects of the second type is half of a bandwidth of the one interconnect of the first type.

15. The memory extension card of claim 14, wherein:
the processing unit is communicatively coupled with three other processing units via either an interconnect of the first type or two interconnects of a third type.

16. The memory extension card of claim 14, wherein:

a form factor for each of the interconnects of the first type is two QSFP-DD ports, the two QSFP-DD ports having a bandwidth equal to or larger than 100 GB/s.

17. The memory extension card of claim 14, wherein:

a form factor for each of the interconnects of the second type is one QSFP-DD port, the one QSFP-DD port having a bandwidth equal to or larger than 50 GB/s; and a form factor for each of the interconnects of the third type is four Mini-SAS ports, the four Mini-SAS ports having a bandwidth equal to or larger than 50 GB/s.

18. The memory extension card of claim 14, wherein the memory extension card is implemented on a field programmable gate array (FPGA).

19. The memory extension card of claim 15, wherein the memory extension card is further configured to perform translations of data between local memory operations and data packets transferred through one or more interconnects of the first type or the second type.

* * * * *